(12) United States Patent
Schmidt et al.

(10) Patent No.: US 11,717,828 B2
(45) Date of Patent: Aug. 8, 2023

(54) VELOCIMETRY-BASED IDENTIFICATION OF SINGLE PROTEINS AND OTHER PARTICLES

(71) Applicants: The Regents of the University of California, Oakland, CA (US); Brigham Young University, Provo, UT (US)

(72) Inventors: Holger Schmidt, Capitola, CA (US); Aaron Roe Hawkins, Provo, UT (US)

(73) Assignees: THE REGENTS OF THE UNIVERSITY OF CALIFORNIA, Oakland, CA (US); BRIGHAM YOUNG UNIVERSITY, Provo, UT (US)

( * ) Notice: Subject to any disclaimer, the term of this patent is extended or adjusted under 35 U.S.C. 154(b) by 575 days.

(21) Appl. No.: 16/471,413

(22) PCT Filed: Dec. 19, 2017

(86) PCT No.: PCT/US2017/067428
§ 371 (c)(1),
(2) Date: Jun. 19, 2019

(87) PCT Pub. No.: WO2018/118998
PCT Pub. Date: Jun. 28, 2018

(65) Prior Publication Data
US 2021/0129147 A1     May 6, 2021

Related U.S. Application Data

(60) Provisional application No. 62/436,921, filed on Dec. 20, 2016.

(51) Int. Cl.
*B01L 3/00*     (2006.01)
*G01N 15/14*    (2006.01)
(Continued)

(52) U.S. Cl.
CPC ... *B01L 3/502761* (2013.01); *B01L 3/502715* (2013.01); *G01N 15/1434* (2013.01);
(Continued)

(58) Field of Classification Search
CPC ....... B01L 2300/0816; B01L 3/502784; B01L 2400/0421; B01L 2200/0673;
(Continued)

(56) References Cited

U.S. PATENT DOCUMENTS 5,699,157 A   12/1997  Parce
7,746,466 B2 * 6/2010  Godin ............... G01N 15/1434
                                                   435/6.19
(Continued)

FOREIGN PATENT DOCUMENTS

AU   2010200179 A1   2/2010
DE   102013015016 A1 9/2014
WO   2004/040319 A1  5/2004

OTHER PUBLICATIONS

International Patent Application No. PCT/US2017/067428; Int'l Preliminary Report on Patentability; dated Apr. 26, 2018; 17 pages.
(Continued)

*Primary Examiner* — Dean Kwak
(74) *Attorney, Agent, or Firm* — Carter, DeLuca & Farrell LLP

(57) ABSTRACT

Spatially distributed optical excitation and integrated waveguides are used for ultrasensitive particle detection based on individual electrokinetic velocities of particles. In some embodiments, chip-integrated systems are used to identify individual particles (e.g., individual molecules) based on their velocity as they move through an optically interrogated channel. Molecular species may be identified and quantified in a fully integrated setting, allowing for particle analysis including molecular analysis that can operate at low copy
(Continued)

numbers down to the level of single-cell lysates. In some embodiments, the single-particle velocimetry-based identification and/or separation techniques are applied to various diagnostic assays, including nucleic acids, metabolites, macromolecules, organelles, cell, synthetic markers, small molecules, organic polymers, hormones, peptides, antibodies, lipids, carbohydrates, inorganic and organic microparticles and nanoparticles, whole viruses, and any combination thereof.

33 Claims, 15 Drawing Sheets

(51) Int. Cl.
G01N 27/447 (2006.01)
G01N 15/10 (2006.01)

(52) U.S. Cl.
CPC ..... *G01N 15/1459* (2013.01); *G01N 15/1484* (2013.01); *G01N 27/44726* (2013.01); *G01N 27/44773* (2013.01); *B01L 2300/0654* (2013.01); *B01L 2400/0418* (2013.01); *B01L 2400/0421* (2013.01); *G01N 2015/1006* (2013.01); *G01N 2015/1075* (2013.01); *G01N 2015/145* (2013.01); *G01N 2015/149* (2013.01)

(58) Field of Classification Search
CPC ............... B01L 2400/0415; B01L 7/52; B01L 2200/0652; B01L 2200/10; B01L 2300/0636; B01L 2300/0864; B01L 3/502753; B01L 2400/0418; B01L 3/5027; B01L 3/502715; B01L 3/502761; B01L 2200/027; B01L 2200/0631; B01L 2300/0654; B01L 2300/1861; B01L 2400/0496; B01L 3/5023; B01L 2300/0645; B01L 2300/0819; B01L 2300/0829; B01L 2300/0861; B01L 2300/087; B01L 2300/12; B01L 2400/0427; B01L 3/0268; B01L 3/5025; B01L 3/502707; B01L 3/50273; B01L 3/502738; C12Q 2565/629; G01N 27/44721; G01N 27/44743; G01N 27/44795; G01N 21/05; G01N 21/6428; G01N 15/1459; G01N 15/1484; G01N 1/405; G01N 2015/1006; G01N 2015/149; G01N 2021/458; G01N 2021/6484; G01N 21/0303; G01N 21/6454; G01N 2201/1087; G01N 27/44756; G01N 27/44773; G01N 27/44791; G01N 30/00; G01N 30/74; G01N 15/1434; G01N 15/1463; G01N 2015/1075; G01N 2015/145; G01N 27/44726

See application file for complete search history.

(56) References Cited

U.S. PATENT DOCUMENTS

2009/0027666 A1* 1/2009 Godin ............... B01L 3/502776
356/246
2013/0083315 A1* 4/2013 Lo ...................... G01N 15/1434
356/402

OTHER PUBLICATIONS

Suz-Kai Hsiung et al: "A microfabricated capillary electrophoresis chip with multiple buried optical fibers and microfocusing lens for multiwavelength detection", ELECTROPHORESIS, vol. 26, No. 6, Mar. 1, 2005, pp. 1122-1129.

Kwok Y C et al: "Velocity Measurement of Particles Flowing in a Microfluidic Chip Using Shah Convolution Fourier Transform Detection", Analytical Chemistry, American Chemical Society, vol. 73, No. 8, Apr. 15, 2001, pp. 1748-1753.

International Patent Application No. PCT/US2017/067428; Int'l Preliminary Report on Patentability; dated Jul. 4, 2019; 10 pages.

* cited by examiner

VELOCIMETRY-BASED IDENTIFICATION OF SINGLE PROTEINS AND OTHER PARTICLES

CROSS-REFERENCE TO RELATED APPLICATIONS

This application is the National Stage Application filed under 35 U.S.C. 371 of International Application No. PCT/US2017/067428, "VELOCIMETRY-BASED IDENTIFICATION OF SINGLE PROTEINS AND OTHER PARTICLES", filed Dec. 19, 2017, which claims the benefit under 35 U.S.C. 119(e) of U.S. Provisional Application No. 62/436,921, "VELOCIMETRY-BASED IDENTIFICATION OF SINGLE PROTEINS AND OTHER PARTICLES", filed Dec. 20, 2016, the contents of which are incorporated herein by reference in their entirety.

FIELD

The present disclosure relates generally to integrated optics, and more particularly to optofluidic platforms. Still more particularly, the present disclosure relates to methods, systems, and techniques for detecting, identifying, and manipulating individual molecules based on their velocity as they move through an optically interrogated channel.

BACKGROUND

Genomics, proteomics, and metabolomics play an increasingly dominant role in disease diagnostics, treatment, and drug development. Molecular analysis based on amounts and changes in concentration of small molecules (nucleic acids, proteins, metabolites) provides unprecedented detail into the workings and disease states of an organism, all the way down to single cells. Current state-of-the-art analysis techniques include polymerase chain reaction (PCR) and capillary (zone) electrophoresis (CE or CZE) with laser-induced fluorescence readout for nucleic acids, and mass spectrometry, liquid chromatography, and CE for proteins, peptides, amino acids and other small molecules.

However, these approaches still face significant limitations for detection of very low copy numbers or very little sample material. Both mass spectrometry and the broadly applicable CE have relatively low sensitivity on the order of ng/mL, or equivalently $10^{12}$-$10^{14}$ particles/mL. This has been identified as a critical barrier for many emerging diagnostic assays, for instance rare circulating tumor cells (CTCs) and low-abundance, free cancer biomarkers in blood (<1 pg/mL-1 ng/mL). Another example is the growing field of single cell analysis, where typical protein concentrations are on the order of $10^2$-$10^4$/cell or, equivalently, $10^8$-$10^{10}$/mL. These levels may be reduced further (~1000×) if the cell volume is diluted in buffers to create workable amounts of liquid. Single cell analysis may be a particularly powerful approach to protein analysis because it eliminates ensemble averaging and allows for detection of a proteome that changes depending on internal and external conditions.

As the demand for assays on the molecular level increases, instruments are required that work rapidly, accurately, with high sensitivity and specificity, yet with low complexity and cost. This has resulted in a significant push towards "lab-on-chip" solutions that can analyze small amounts of analyte and reagents in a compact device, and both PCR and CE separations of nucleic acids, amino acids, and proteins have successfully been demonstrated. While low abundance detection currently remains out of reach for conventional CE techniques, it has been demonstrated that electrophoretic separation coupled with single molecule spectroscopy can detect single cell protein concentrations. However, the required optical apparatus remains complex, bulky, and expensive and is not well suited for miniaturization.

SUMMARY

As described above, demand for assays on the molecular level has increased, and there is an unmet need for low abundance detection and detection at single cell protein concentrations without the requirement for complex, bulky, and expensive devices and systems. The systems, methods, and techniques disclosed herein may address that unmet need. In some embodiments, the techniques may be referred to as "Single Particle Separation" (SPS) techniques. In some embodiments, the techniques may be used to identify and quantify molecular species in fully integrated settings, and may fill the need for a molecular analysis platform that can operate at low copy numbers, including down to the level of single cell lysates.

Through spatially distributed optical excitation using integrated waveguides, ultrasensitive particle detection based on a particle's individual electrokinetic velocity may be achieved. In some embodiments, the molecular analysis and manipulation techniques described herein may exploit the lab-on-chip paradigm to identify individual molecules based on their velocity as they move through an optically interrogated channel. These techniques may enable identification and quantification of molecular species in a fully integrated setting. These techniques allow for a molecular analysis platform that can operate at low copy numbers down to the level of single cell lysates. While this disclosure discusses the examples of amino acids and protein analysis, the techniques discussed herein may be similarly applicable to a broad range of analytical measurements, including nucleic acids, metabolites, macromolecules, organelles, cell, synthetic markers, small molecules, organic polymers, hormones, peptides, antibodies, lipids, carbohydrates, inorganic and organic microparticles and nanoparticles, whole viruses, and any combination thereof.

In some embodiments, a first system, for identifying a particle based on a velocity of the particle, is provided, the first system comprising: a substrate; a fluidic channel disposed on the substrate and configured to allow the flow of a particle labeled with a fluorophore in a mixture through the channel; a voltage source configured to generate an electrical field for inducing electrophoretic or electroosmotic flow of the particle in the channel; one or more optical components configured to cause an excitation spot pattern to be incident on the channel, such that the particle is optically excited as it flows past the excitation spot pattern; and one or more optical sensors configured to detect a plurality of signal spikes emitted by the particle in response to the particle being illuminated by the excitation spot pattern, wherein the plurality of signal spikes comprises a first fluorescence signal spike emitted by the particle in response to the particle being illuminated by the excitation spot pattern and a second fluorescence signal spike emitted by the particle in response to the particle being illuminated by the excitation spot pattern; and one or more processors configured to: calculate, based on the plurality of signal spikes, a velocity of the particle; and determine, based on the calculated velocity, an identity of the particle.

In some embodiments of the first system, determining an identity of the particle comprises determining a molecular makeup of the particle In some embodiments of the first system, determining an identity of the particle comprises determining a type of particle to which the particle corresponds.

In some embodiments of the first system, wherein determining an identity of the particle comprises determining whether the particle is a same type of particle as a second particle.

In some embodiments of the first system, wherein determining an identity of the particle comprises matching the calculated velocity to a previously-measured velocity of a second particle, wherein the previously-measured velocity is retrieved from a look-up table.

In some embodiments of the first system, wherein determining the identity of the particle comprises matching the calculated velocity of the particle to a theoretically calculated velocity for a type of particle.

In some embodiments of the first system, the excitation spot pattern comprises a first excitation spot incident on the channel at a first location and a second excitation spot incident on the channel at a second location spaced apart from the first location by a spacing distance.

In some embodiments of the first system, wherein calculating velocity of the particle comprises determining a time difference between a time at which the first fluorescence signal spike was detected and a time at which the second fluorescence signal spike was emitted, and calculating the velocity based on the time difference and the spacing distance.

In some embodiments of the first system, the spacing distance is less than 0.1 µm, 0.5 µm, 1 µm, 2 µm, 5 µm, 10 µm, 20 µm, 50 µm, 100 µm, 500 µm, 1000 µm, 1 cm, 5 cm, 10 cm, or 20 cm.

In some embodiments of the first system, the one or more optical components comprise a light source configured to generate a spot pattern remote from the substrate.

In some embodiments of the first system, the one or more optical components comprise one or more waveguides disposed on the substrate.

In some embodiments of the first system, the one or more waveguides comprise one or more optical splitters configured to split a single optical input into a plurality of optical outputs.

In some embodiments of the first system, the one or more optical splitters comprise a plurality of optical splitters arranged in series and configured to create an excitation spot pattern having two or more excitation spots.

In some embodiments of the first system, the one or more waveguides comprise a multi-mode interference waveguide configured to generate the excitation spot pattern as an interference-based spot pattern.

In some embodiments of the first system, the plurality of signal spikes are detected as part of a raw signal, and the one or more processors are further configured to: generate a transformed signal by calculating a time-shifted product of the raw signal with itself; calculate the velocity based on the transformed signal.

In some embodiments of the first system, calculating the time-shifted product of the raw signal with itself comprises calculating the product using one factor per excitation spots in the excitation spot pattern.

In some embodiments of the first system, the one or more optical sensors are configured to detect single small-molecule particles.

In some embodiments of the first system, the one or more optical sensors comprise an integrated optical sensor disposed on the substrate and configured to collect the plurality of signal spikes via planar beam paths.

In some embodiments of the first system, the integrated optical sensor is configured to collect the plurality of signal spikes via an integrated liquid core waveguide.

In some embodiments of the first system, the channel is less than less than 25 µm, 50 µm, 100 µm, 1000 µm, 1 cm, 10 cm, 50 cm, 1 m, or 5 m in length. in length.

In some embodiments of the first system, an internal volume of the fluidic channel excited by a spot of the spot pattern is less than 1 picoliter.

In some embodiments of the first system, the voltage source is configured to generate an electrical field for inducing electrophoretic and electroosmotic flow of the particle in the channel.

In some embodiments, a second system, for separating particles based on individual particle velocity, is provided, the second system comprising: a substrate; a fluidic channel disposed on the substrate and configured to allow the flow of a particle labeled with a fluorophore in a mixture through the channel; a voltage source configured to generate an electrical field for inducing electrokinetic flow of the particle in the channel; one or more optical components configured to cause an excitation spot pattern to be incident on the channel, such that the particle is optically excited as it flows past the excitation spot pattern; and one or more optical sensors configured to detect a plurality of signal spikes emitted by the particle in response to the particle being illuminated by the excitation spot pattern, wherein the plurality of signal spikes comprises a first fluorescence signal spike emitted by the particle in response to the particle being illuminated by the excitation spot pattern and a second fluorescence signal spike emitted by the particle in response to the particle being illuminated by the excitation spot pattern; a particle separation control component configured to physically separate the particle from one or more other particles included in the mixture; and one or more processors configured to: calculate, based on the plurality of signal spikes, a velocity of the particle; and in accordance with a determination that the calculated velocity of the particle satisfies predefined criteria, causing the separation control component to direct the particle to flow to a first output location; and in accordance with a determination that the calculated velocity of the particle does not satisfy the predefined criteria, causing the separation control component to direct the particle to flow to a second output.

In some embodiments of the second system, the separation control component comprises a valve configured to open or close a flow path for the particle to flow from the channel to one of the first output and the second output.

In some embodiments of the second system, the separation control component comprises a second voltage source configured to generate a second electrical field configured to induce electrophoresis in the particle to cause the particle to flow from the channel to one or the first output and the second output.

In some embodiments of the second system, the channel is part of a hollow-core waveguide of a planar optofluidic platform disposed on the substrate.

In some embodiments, a method, for identifying a particle based on a velocity of a particle using a planar optofluidic system, is provided, the method comprising: introducing a liquid mixture into a channel of the planar optofluidic system, wherein the mixture comprises a particle labeled with a fluorophore; generating, by a voltage source of the planar optofluidic system, an electrical field configured to induce electrokinetic motion to cause the particle to flow along the channel; as the particle flows past an excitation spot pattern comprising a plurality of excitation spots, illuminating the particle by each of the plurality of excitation spots, wherein the plurality of excitation spots comprises a first excitation spot and a second excitation spot; detecting, by an optical detector of the planar optofluidic system, a plurality of signal spikes emitted by the particle in response to the particle being illuminated by the excitation spot pattern, wherein the plurality of signal spikes comprises a first fluorescence signal spike emitted by the particle in response to the particle being illuminated by the first excitation spot and a second fluorescence signal spike emitted by the particle in response to the particle being illuminated by the second excitation spot; calculating, by one or more processors of the integrated optofluidic system, based on the plurality of signal spikes, a velocity of the particle; and determining, by the one or more processors, based on the calculated velocity, an identity of the particle.

In some embodiments, the method further comprises: in accordance with a determination that the calculated velocity of the particle satisfies predefined criteria, directing, by a separation control component of the planar optofluidic system, the particle to flow to a first output location; and in accordance with a determination that the calculated velocity of the particle does not satisfy the predefined criteria, directing, by a separation control component of the planar optofluidic system, the particle to flow to a second output location.

In some embodiments, a third system, for identifying a particle based on a velocity of the particle, is provided, the third system comprising: a substrate; a fluidic channel disposed on the substrate and configured to allow the flow of particles labeled with a fluorophore in a mixture through the channel; a voltage source configured to generate an electrical field for inducing electrokinetic motion in the particle in the channel; one or more optical components configured to cause a first excitation spot pattern and a second excitation spot pattern to be incident on the channel, such that particles are optically excited as they flow past one or both of the excitation spot patterns, wherein: the first excitation spot pattern comprises light at a first wavelength; the second excitation spot pattern comprises light at a second wavelength; one or more of a number of spots and a spacing of spots is different in the first pattern and the second pattern; one or more optical sensors configured to detect a plurality of signal spikes emitted by the particle in response to the particle being illuminated by the excitation spot pattern, wherein the plurality of signal spikes comprises a first fluorescence signal spike emitted by a particle in response to the particle being illuminated by one or more of the excitation spot patterns and a second fluorescence signal spike emitted by the particle in response to the particle being illuminated by the excitation spot pattern; and one or more processors configured to: calculate, based on the plurality of signal spikes, a velocity of the particle; calculate, based on the plurality of signal spikes, a spacing of the signal spikes; and determine, based on the calculated velocity and the calculated spacing, an identity of the particle.

In some embodiments of the third system, the spacing is a time spacing indicative of a spacing distance between excitation spots in one of the excitation spot patterns.

In some embodiments of the third system, determining, based on the calculated spacing, an identity of the particle comprises: determining that the calculated spacing corresponds to a spacing of the first excitation spot pattern and not to a spacing of the second excitation spot pattern; and determining that the particle is a particle type that is excited by light of the first spot pattern and not the second spot pattern.

In some embodiments of the third system, the processor is further configured to determine a total number of fluorescence signal spikes detected as the particle moves past the excitation spot patterns; and determining an identity of the particle comprises determining the identity of the particle based on the determined number of fluorescence signal spikes.

In some embodiments of the third system, determining the identity of the particle based on the determined number of fluorescence signal spikes comprises: determining that the determined number of fluorescence signal spikes corresponds to a number of spots in the first excitation spot pattern and not to a number of spots in the second excitation spot pattern; determining that the particle is a particle type that is excited by light of the first spot pattern and not the second spot pattern.

In some embodiments, any one or more of the features, characteristics, or elements discussed above with respect to any of embodiments of the systems or the method may be incorporated into any of the other embodiments of the systems or the method mentioned above. In some embodiments, any one or more of the features, characteristics, or elements discussed elsewhere in this disclosure may be incorporated into any of the embodiments of the systems or the method mentioned above.

DETAILED DESCRIPTION

Figure 1A:
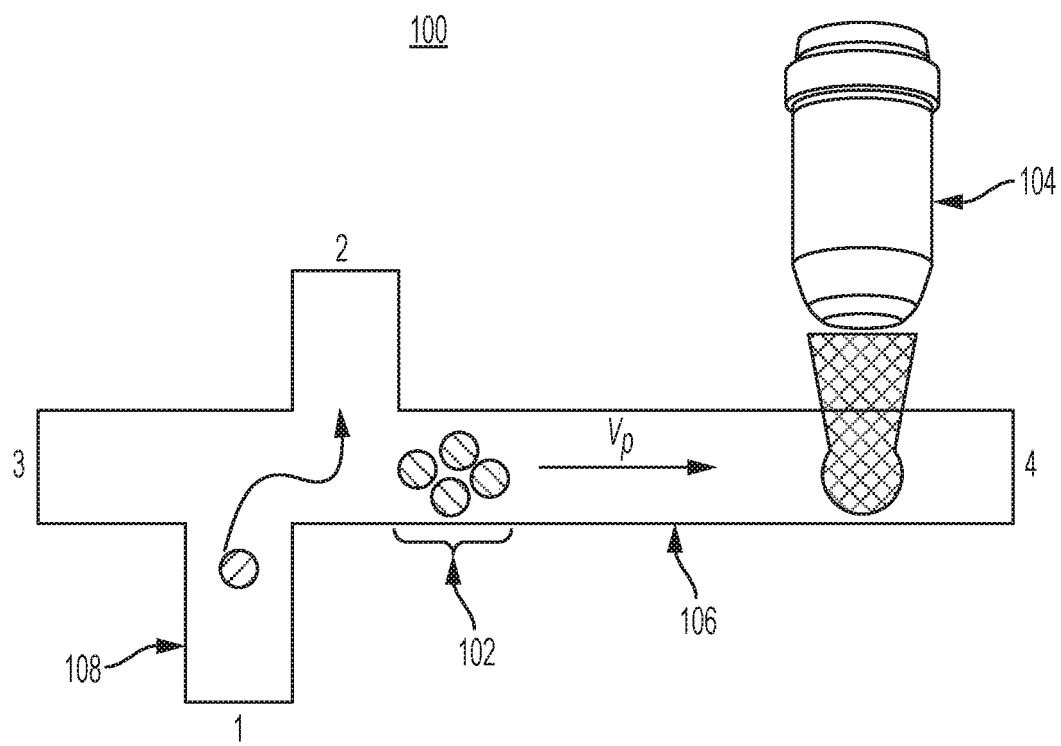
FIG. 1A is a schematic view of a conventional plug-based CE separation system, in accordance with some embodiments.

Described below are exemplary embodiments of systems, devices, methods, and techniques for single-particle velocimetry-based identification and/or separation. Below, the description of FIG. 1A primarily describes conventional plug-based CE separation. In contrast, the description of FIG. 1B primarily describes single-particle velocimetry-based identification, which may analyze single particles based on their individual velocities, rather than collectively analyzing a plurality of particles as part of a collective plug. The description of FIG. 1C primarily describes data analysis that may be performed in accordance with single-particle velocimetry-based identification. The description of FIGS. 2A-2C primarily describes chip-based systems and components thereof for single-particle velocimetry-based identification and/or separation. The description of FIGS. 3A-3D primarily describes data analysis in accordance with single-particle velocimetry-based identification and/or separation, such as to sort individual particles into bins based on their individual velocities in order to count a number of each of a plurality of types of particle. The description of FIGS. 3A-3D primarily describes a computer, which may be integrated into any one or more of the systems and devices described herein.

The following description sets forth exemplary systems, methods, techniques, parameters, and the like. It should be recognized, however, that such description is not intended as a limitation on the scope of the present disclosure but is instead provided as a description of exemplary embodiments.

Definitions

For purposes of interpreting this specification, the following definitions will apply and whenever appropriate, terms used in the singular will also include the plural and vice versa. In the event that any definition set forth below conflicts with any document incorporated herein by reference, the definition set forth shall control.

As used herein, the singular form "a", "an", and "the" includes plural references unless indicated otherwise.

It is understood that aspects and embodiments of the invention described herein include "comprising," "consisting," and "consisting essentially of" aspects and embodiments.

It is further understood that the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "about" as used herein refers to the usual error range for the respective value readily known to the skilled person in this technical field. Reference to "about" a value or parameter herein includes (and describes) embodiments that are directed to that value or parameter per se.

Although the description herein uses terms first, second, etc. to describe various elements, these elements should not be limited by the terms. These terms are only used to distinguish one element from another.

For any of the structural and functional characteristics described herein, methods of determining these characteristics are known in the art.

All references cited herein, including patent applications and publications, are incorporated by reference in their entirety.

Capillary Electrophoresis and Velocimetry-Based Single-Particle Detection

Conventional electrophoretic separation methods rely on particles moving at different speeds based on their electrophoretic mobility under electric fields. That is, when the same electric field is applied to particles having different charges, the particles may move at different speeds due to the difference in force exerted on the different particles by the electric field.

In conventional electrophoretic separation systems, a mixture of fluorescent particles may be driven down a long channel (typically several cm) by an applied voltage. As separation into groups traveling at different velocities (plugs) occurs, the plugs are detected using laser-induced fluorescence and a microscope objective. In this configuration both diffusion and finite channel length result in a finite width of the electropherogram peak, limiting resolution. Further, optical detection systems and methods typically require relatively large particle numbers in a group to be effective.

FIG. 1A is a schematic view of plug-based CE separation system 100. In some embodiments, system 100 may be a chip-based CE system. As shown, system 100 may comprise fluidic channel 106 configured to allow the flow of particles from point 3 to point 4, and may include excitation light source 104 configured to direct an excitation light onto particles traveling along channel 106. In some embodiments, excitation light source 104 may be a laser configured to excite fluorescent particles (e.g., auto-fluorescent particles or particles tagged with a fluorescent agent) in order to cause the particles to fluoresce, such that the fluorescent emission of the particle may be detected by one or more light detectors, sensors, cameras, or image capture-devices. In some embodiments, some or all of the components of system 100 may be disposed on a microfluidic chip.

As shown in FIG. 1A, system 100 may be configured such that particles travelling through channel 106 may group into plugs, such as plug 102. In some embodiments, system 100 may comprise cross-voltage channel that may intersect channel 106 at an angle. Channel 106 may be used to inject plugs into channel 108, in that particles may flow through cross-voltage channel 108 and become grouped into plugs, and the plugs may then enter channel 106 and be pulled through channel 106 and toward an excitation area by the voltage applied along channel 106.

A plug may be any plurality of particles traveling together and/or sharing one or more characteristics in common with one another. In some embodiments, particles included in a plug may include individual molecules, particles included in single-cell lysates, amino acids, proteins, nucleic acids, metabolites, and/or whole viruses. In system 100, particles traveling in channel 106 may separate into and/or be grouped into plugs, where each plug is a group of a plurality of particles having same or similar charges and therefore experiencing same or similar force and moving at a same or similar speed under the same electric field. In some embodiments, channel 106 may be long enough such that plugs in a mixture having different types of particles may separate from one another as they flow at different velocities through channel 106 under electrokinetic force; the plugs may space apart sufficiently such that the system may detect the plugs that do not overlap with one another and the system can detect them separately. Typically, channel 106 is greater than 1 cm, which provides sufficient travel distance and time for plugs in a mixture to separate from one another during flow.

As shown in FIG. 1, plug 102 may have velocity $v_p$, which may be the average velocity at which particles in plug 102 travel under electrokinetic force through channel 106. Plugs having a higher plug velocity may arrive at an excitation location and/or a location being monitored by a light sensor before plug 102, and plugs having a lower plug velocity may arrive at an excitation location and/or a location being monitored by a light sensor after plug 102. In this way, the order of arrival of various plugs at an excitation location and/or a location being monitored by a light sensor may be used to determine which plugs correspond to which particle types—those plugs arriving sooner may be known to contain particles experiencing greater electrokinetic force and therefore traveling at a higher velocity, while those plugs arriving later may be known to contain particles experiencing lesser electrokinetic force and therefore traveling at a lower velocity.

Figure 1B:
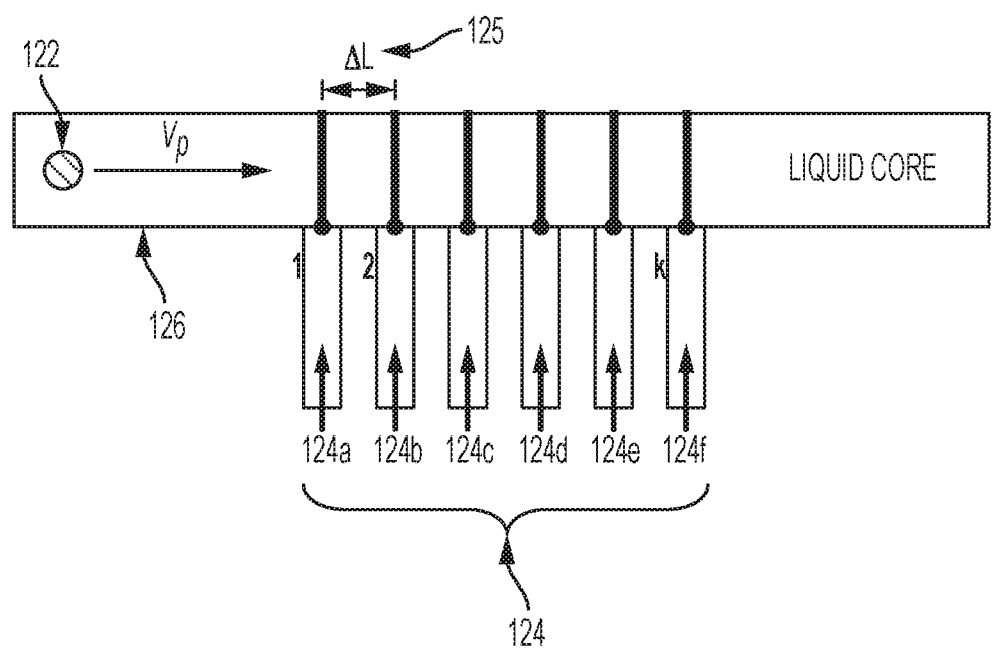
FIG. 1B is a schematic view a system for single-particle velocimetry-based identification and/or separation, in accordance with some embodiments.

FIG. 1B is a schematic view of system 120 for single-particle velocimetry-based identification and/or separation, in accordance with some embodiments. In system 120, individual particles may be identified by their velocity, which may create unique, multi-peak temporal signals upon multi-spot excitation. As in CE systems such as system 100, particles in system 120 may be transported electrokinetically along a microfluidic channel and acquire a characteristic velocity $v_p$. However, particles in system 120 may be detected individually instead of in a large ensemble such as a plug. This may eliminate resolution limitations due to finite plug width, but may also require single-particle sensitivity and using multi-spot excitation.

Figure 2A:
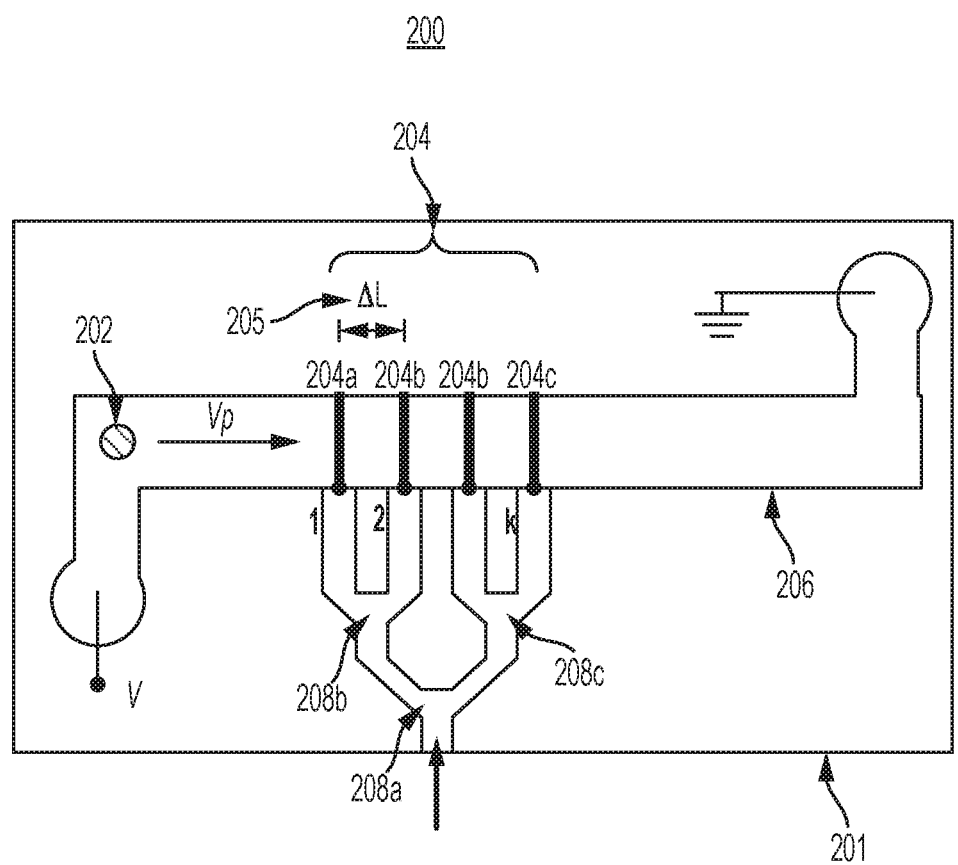
FIG. 2A is a schematic view of an optofluidic chip for single-particle velocimetry-based identification and/or separation, in accordance with some embodiments.

Thus, unlike system 100 of FIG. 1A, system 120 of FIG. 2A may be configured to detect, identify, and differentiate individual particles, rather than being configured merely to analyze particles grouped into plugs. Furthermore, system 120 may be configured to differentiate particles from one another based on an observed and measured velocity of an individual particle, rather than based merely on arrival order of widely spatially distributed plugs of particles. That is, rather than requiring a long channel to allow different kinds of particles to separate into plugs and to allow particles with different charges to widely separate from one another such that arrival order may be used to determine particle identity, system 120 may be operable with a very short channel such that particles may arrive in any order and without necessarily being separated into plugs. As particles arrive, the system may assess a velocity (rather than merely an arrival order) of each particle in order to determine information about the particle).

As shown in FIG. 1B, system 120 may comprise channel 126 for transporting particle 122, which may be included along with one or more other particles in a liquid mixture inside channel 122. Particle 122, which may flow through channel 126, may be an individual molecule, a particle included in single-cell lysate, an amino acid, a protein, a nucleic acid, a metabolite, and/or a whole virus. As shown, particle 122 may have characteristic velocity $v_p$.

In some embodiments, unlike the longer channel 106 of system 100, channel 126 of system 120 may be equal to or less than 1000 µm, 100 µm, 50 µm, or 25 µm in length. In some embodiments, channel 126 may be equal to or less than 1 cm, 10 cm, 50 cm, 1 m, or 5 m in length. Channel 126 in some embodiments is equal to or greater than 10 µm, 20 µm, 50 µm, 100 µm, 1000 µm, 1 cm, 10 cm, 50 cm, or 1 m in length. in length. This channel length may be sufficiently long to excite particles traveling through the channel at a plurality of different excitation spots, but may be substantially shorter than the longer channels required to allow for substantial spatial separation of plugs from one another while in transit.

It should be noted that, in system 120, channel 126 need not intersect with any cross-voltage channel, and no cross-voltage need be applied, because there is no need or desire to separate particles into plugs, since each particle may be detected and measured individually.

Instead of a single excitation light source as in system 100, system 120 may comprise excitation zone 124, which may be a portion of channel 126 in which a plurality of excitation spots are incident on particles in the channel. In the example shown, excitation zone 124 comprises six excitation spots 124a-124f, although any number k of excitation spots may be used.

As shown, excitation spots 124a-124f may be evenly spaced apart from one another by a spacing distance 125, which may be referred to as ΔL. In some embodiments, ΔL may be about 0.1 µm, 0.5 µm, 1 µm, 2 µm, 5 µm, 10 µm, 20 µm, 50 µm, 100 µm, 500 µm, 1000 µm, 1 cm, 5 cm, or 10 cm. In some embodiments, ΔL may be greater than or equal to 0.05 µm, 0.1 µm, 0.5 µm, 1 µm, 2 µm, 5 µm, 10 µm, 20 µm, 50 µm, 100 µm, 500 µm, 1000 µm, 1 cm, 5 cm, or 10 cm. In some embodiments, ΔL may be less than or equal to 0.1 µm, 0.5 µm, 1 µm, 2 µm, 5 µm, 10 µm, 20 µm, 50 µm, 100 µm, 500 µm, 1000 µm, 1 cm, 5 cm, 10 cm, or 20 cm. In some embodiments, excitation spots may be spaced evenly from one another, such that each is separated from the spot(s) beside it by the same spacing distance; in some embodiments, irregular spacing for different excitation spots may be used. In some embodiments, as discussed in additional detail below, multiple excitation spots may be, created on-chip using one or more optical splitters to split a single excitation light beam into multiple light beams, by using separate light sources (e.g., multiple lasers), or by using a multi-mode interference waveguide or an arrayed waveguide grating (AWG). System 120 may further comprise one or more light detectors, sensors, cameras, or image capture-devices configured to detect fluorescent emission of particles due to excitation by excitation spots 124a-124f.

In some embodiments, as discussed in additional detail below, some or all components of system 120 may be disposed on a single substrate, such as when system 100 is (or includes) a microfluidic chip.

Figure 1C:
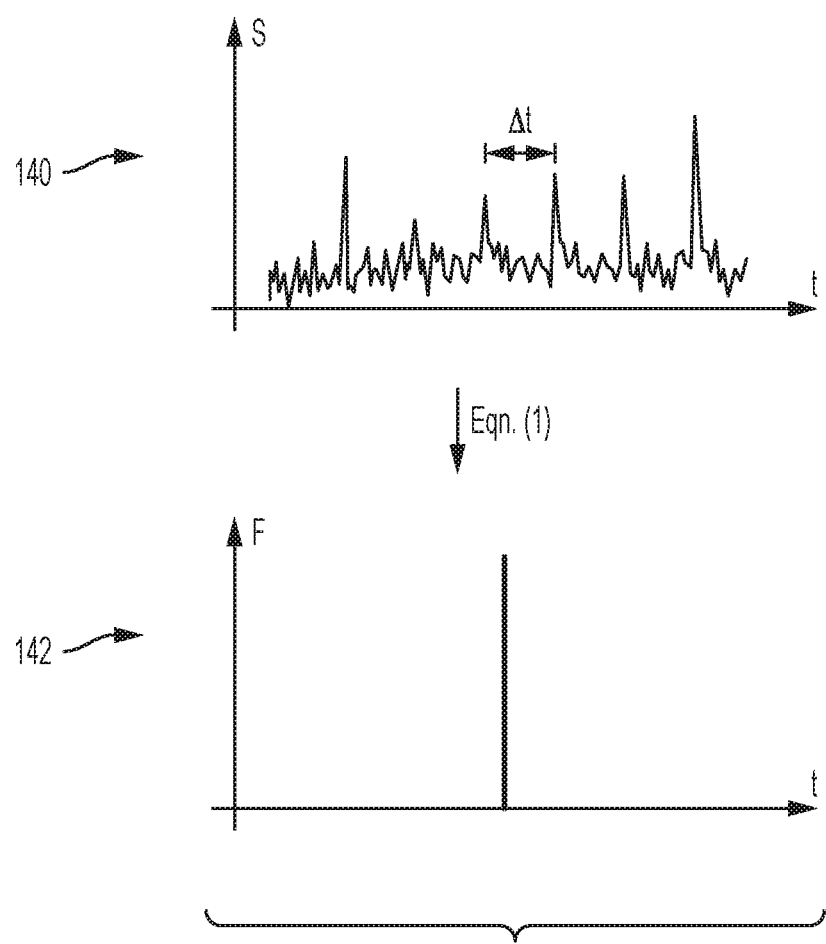
FIG. 1C is an illustration of data manipulation for single-particle velocimetry-based identification, in accordance with some embodiments.

FIG. 1C is an illustration of data manipulation for single-particle velocimetry-based identification, in accordance with some embodiments. FIG. 1C shows how raw signal 140 may be transformed by equation 1 (shown below) into transformed signal 142. In some embodiments, raw signal 140 may be collected by a single-particle velocimetry-based identification system such as system 120 discussed above with reference to FIG. 1B. As explained below, FIG. 1C illustrates signal-to-noise improvement by analyzing a raw signal having one prominent peak per excitation spot to produce a transformed signal having a dominant peak per particle with improved signal-to-background value.

As shown in FIG. 1B, each particle in a system such as system 120 may be optically excited at k spots spaced by ΔL. This may result in k distinct fluorescence bursts with a time spacing Δt for the bursts that is related to the particle velocity by $\Delta t = \Delta L/v_p$. Thus, the system may be able to uniquely identify a particle by extracting its velocity from the time-dependent fluorescence signal. This multi-spot excitation approach may also significantly improve the detection sensitivity. Because the signal from a particle may be highly correlated in time (k bursts spaced by Δt), the signal may be separated from background noise very effectively with a correlation algorithm that calculates the time-shifted product of the raw signal S(t) with itself:

$$F(t) = S(t) \cdot S(t + \Delta t) \cdot S(t + 2\Delta t) \cdot \ldots \cdot S(t + (k-1) \cdot \Delta t) = \prod_{n=0}^{k-1} S(t + n \cdot \Delta t)$$

As shown in FIG. 1C, equation 1 may be used to process signal 140 into signal 142. The noisy signal 140 of a single particle creating k=6 small fluorescence peaks may be transformed by equation 1 into a signal with a, large, dominant, and easily identifiable peak that indicates that one particle with a particular velocity $v_p$ has moved across a multi-spot excitation zone (e.g., zone 124). Collecting and processing a signal in this manner may drastically reduce the limit of detection (LoD) for particle detection and identification as compared to conventional CE techniques. For example, in known CE systems, sensitivity may be severely limited due to plug broadening and diffusion broadening across cm-long column lengths. In single-particle detection systems such as system 120, on the other hand, excitation may occur on single particles over ~1,000× shorter distances (50-100 μm), which may essentially eliminate any effects of particle diffusion on velocity uncertainty. Alternately or in addition to the use of the equation set out above, in some embodiments, velocity may be extracted from one or more excitation patterns by taking a Fourier transform of the detected time-dependent signal. In some embodiments, applying a Fourier transform in such a manner may yield a signal with a, large, dominant, and easily identifiable peak that indicates that one particle with a particular velocity $v_p$.

In some embodiments, single-particle velocimetry-based identification and/or separation may be implemented in on-chip systems in which some or all components of the system are integrated into a microfluidic chip. For example, single-particle velocimetry-based identification and/or separation techniques may in some embodiments be implemented by modifying existing planar optofluidic platforms based on optical waveguides (e.g. ARROWs), such as a planar optofluidic platform as described in, for example, U.S. Pat. Nos. 7,149,396, 7,127,146, and/or 7,444,053, all of which are hereby incorporated by reference in their entirety. In some embodiments, implementing single-particle velocimetry-based identification and/or separation via planar optofluidics (i.e. by using waveguide-based excitation and signal collection in the channel plane) may make the technique easy to implement, extremely accurate, and compatible with additional integration, for example electronic or microfluidic components and layers.

Figure 2B:
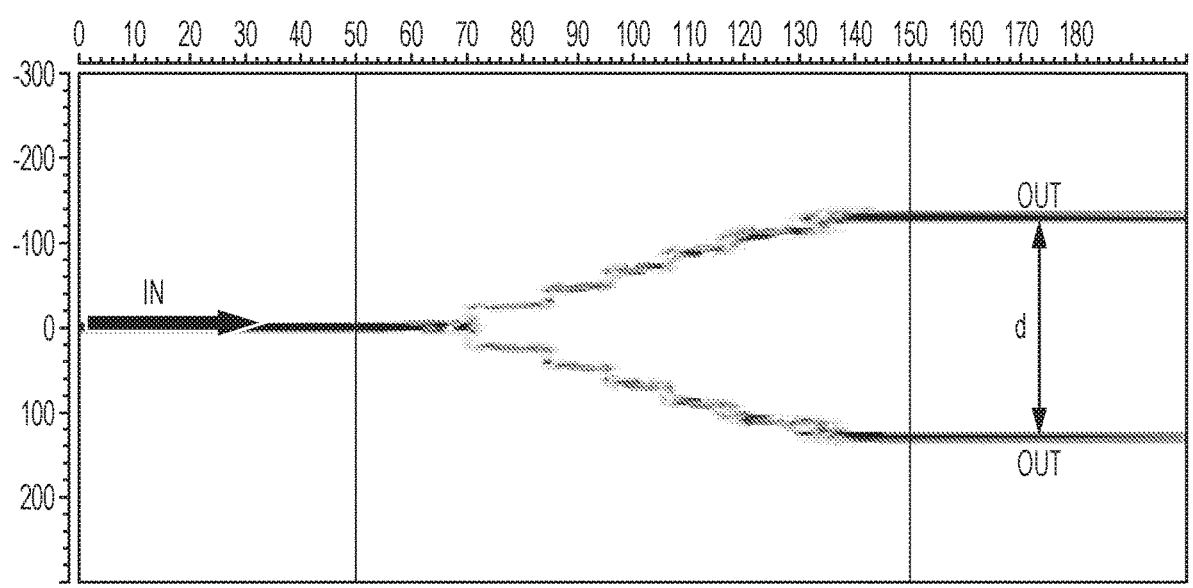
FIG. 2B is an illustration of light propagation through an optical splitter, in accordance with some embodiments.
Figure 2C:
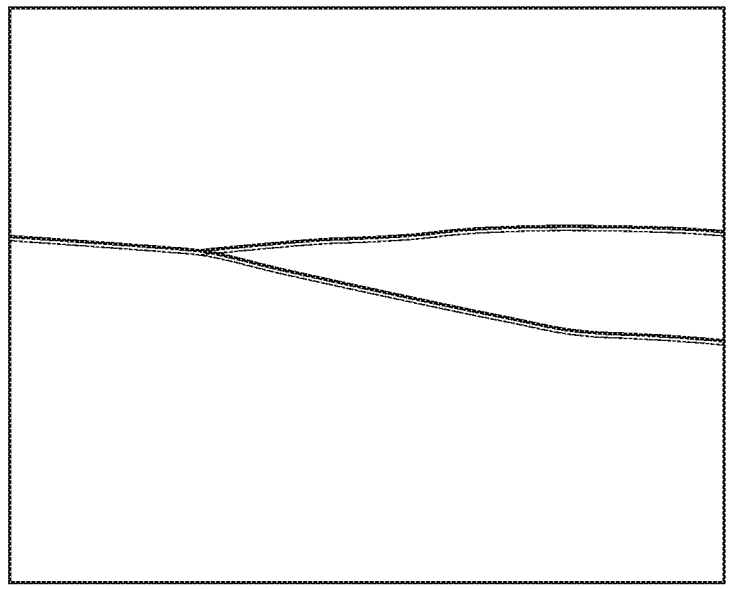
FIG. 2C is an illustration of an optical splitter, in accordance with some embodiments.

FIGS. 2A-2C depict chip-based systems and components thereof for single-particle velocimetry-based identification and/or separation, in accordance with some embodiments.

FIG. 2A is a schematic view of an optofluidic chip for single-particle velocimetry-based identification and/or separation, in accordance with some embodiments. FIG. 2B is an illustration of light propagation through an optical splitter, in accordance with some embodiments. FIG. 2C is a photograph of an optical splitter, in accordance with some embodiments;

FIG. 2A shows a schematic view of chip 200, which may be an optofluidic chip for single-particle velocimetry-based identification and/or separation. As shown, chip 200 may comprise one or more components disposed on substrate 201, which may comprise silicon, semiconductors, glass, and/or polymers, and which may have a length and/or width of approximately 0.25 cm, 0.5 cm, 0.75 cm, 1 cm, or 2 cm. In some embodiments, substrate 201 may have a length and/or width of less than 0.25 cm, 0.5 cm, 0.75 cm, 1 cm, 2 cm, or 3 cm. In some embodiments, substrate 201 may have a length and/or width of greater than 0.1 cm, 0.25 cm, 0.5 cm, 0.75 cm, 1 cm, or 2 cm.

Chip 200 may comprise channel 206 through which particle 202 may flow. In some embodiments, particle 202 may share some or all characteristics in common with particle 122, including being an individual molecule, a particle included in single-cell lysate, an amino acid, a protein, a nucleic acid, a metabolite, and/or a whole virus.

In some embodiments, channel 206 may share some or all characteristics in common with channel 126. In some embodiments, channel 206 may be equal to or less than 1000 μm, 100 μm, 50 μm, or 10 μm in length. In some embodiments, channel 206 may be equal to or greater than 1 μm, 5 μm, 10 μm, 20 μm, or 50 μm in length. In some embodiments, channel 206 may be a liquid core of a liquid-core optical waveguide such as an ARROW waveguide. In some embodiments, in addition to or in place of an ARROW waveguide, a high-index liquid waveguide and/or a slot waveguide may be used. Channel 206 may have a fluid inlet via which fluid (e.g., a mixture containing fluorescently-tagged particles) may be introduced into the channel and an outlet through which fluid may exit the channel.

As shown in FIG. 2A, channel 206 may have a voltage applied along it to exert electrokinetic force on particle 202 (and any other particles included in a mixture inside channel 206) to cause particle 202 to flow along channel 206 and through excitation zone 204. In some embodiments, the voltage applied to cause particles to move through the channel may be about 10 volts, about 100 volts, about 500 volts, about 1,000 volts, about 5,000 volts, or about 10,000 volts. In some embodiments, the voltage may be greater than or equal to 1 volt, 5 volts, 10 volts, 100 volts, 500 volts, 5,000 volts, or 10,000 volts. In some embodiments, the voltage may be less than or equal to 2 volts, 5 volts, 10 volts, 100 volts, 500 volts, 5,000 volts, 10,000 volts, or 50,000 volts.

The fluid in which particles are suspended in the channel may in some embodiments be selected such that no or negligible electro-osmotic flow is induced under the voltages applied by the system; if electro-osmotic flow is induced in the fluid itself, then measurements and calculations intended to reflect the electro-kinetic movement of the particles themselves may be compromised by flow of the fluid instead. In embodiments in which electro-osmotic flow is induced, the particle's total velocity relative to the channel may be its electrophoretic velocity plus the velocity of electro-osmotic flow of the fluid; in these cases, calculations may be modified to account for the additional velocity introduced by electro-osmotic flow.

Channel 206 may have a length that is sufficiently long to excite particles traveling through the channel at a plurality of different excitation spots, but that may not be sufficiently long to allow for separation of particles into plugs while in transit. In some embodiments, channel 206 may have a length that is sufficiently greater than the overall length of excitation zone 204 such that particles can accelerate to their full characteristic velocity upstream of excitation zone 204, such that the particle travels at its characteristic velocity throughout excitation zone 204. In some embodiments, channel 206 may extend beyond excitation zone 204 by about 5 µm, 10 µm, 50 µm, 100 µm, or 500 µm on one or both ends of excitation zone 204. In some embodiments, the distance by which channel 206 may extend beyond an end of excitation zone 204 may be greater than or equal to 1 µm, 5 µm, 10 µm, 50 µm, 100 µm, or 500 µm. In some embodiments, the distance by which channel 206b may extend beyond an end of excitation zone 204 may be less than or equal to 5 µm, 10 µm, 50 µm, 100 µm, or 500 µm, 1000 µm, 1 cm, or 5 cm.

As shown in FIG. 2A, chip 200 may comprise excitation zone 204, which may include k excitation sports 204a-204d spaced apart from one another by spot spacing distance 205, which may be called ΔL. Excitation spots may be defined by an area in which a beam of light intersects with channel 126. In some embodiments, the excitation spot may be focused such that it intersects with channel 126 at a narrowest portion of the beam of light. In some embodiments, an excitation spot may be about 0.5 µm, 1 µm, 2.5 µm, or 5 µm in diameter, where diameter may be defined by the full width at half maximum (FWHM) of the light intensity measured along the direction of channel 126. In some embodiments, an excitation spot may be less than 0.5 µm, 1 µm, 2.5 µm, 5 µm, or 10 µm in diameter. In some embodiments, an excitation spot may be greater than 0.1 µm, 0.5 µm, 1 µm, 2.5 µm, or 5 µm in diameter. In some embodiments, the volume of fluid in channel 126 excited by a single excitation spot may be less than one nanoliter, less than one picoliter, or less than one femtoliter. In some embodiments, the volume of fluid in channel 126 excited by a single excitation spot may be greater than one attoliter, greater than one femtoliter, or greater than one picoliter.

In some embodiments, ΔL may be about 0.1 µm, 0.5 µm, 1 µm, 2 µm, 5 µm, 10 µm, 20 µm, 50 µm, 100 µm, 500 µm, 1000 µm, 1 cm, 5 cm, or 10 cm. In some embodiments, ΔL may be greater than or equal to 0.05 µm, 0.1 µm, 0.5 µm, 1 µm, 2 µm, 5 µm, 10 µm, 20 µm, 50 µm, 100 µm, 500 µm, 1000 µm, 1 cm, 5 cm, or 10 cm. In some embodiments, ΔL may be less than or equal to 0.1 µm, 0.5 µm, 1 µm, 2 µm, 5 µm, 10 µm, 20 µm, 50 µm, 100 µm, 500 µm, 1000 µm, 1 cm, 5 cm, 10 cm, or 20 cm. In some embodiments, excitation zone 204 may share some or all characteristics in common with excitation zone 124 in system 120. In the example of excitation zone 204, there are four excitation spots.

As mentioned above with respect to system 120, multiple excitation spots may be created for an excitation zone by using one or more optical splitters to split a single excitation light beam into multiple light beams, by using separate light sources (e.g., multiple lasers), or by using a multi-mode interference waveguide or an arrayed waveguide grating (AWG). In some embodiments, excitation light directed to intersect channel 206 may be carried to channel 206 by one or more waveguides, which may in some embodiments be solid-core waveguides such as solid-core ARROWs. In the example of system 200 in FIG. 2A, optical splitters 208a-c are used to split a single beam of excitation light into two beams and then ultimately into four beams, with one beam corresponding to each of the four excitation spots. In some embodiments, splitters 208a-c may be 1-in-2 "y-splitters," which are integrated optical elements for splitting and routing of optical signals on chips. In some embodiments, alternate or additional kinds of optical splitters may be used, such as splitters configured to generate more than two output signals. In some embodiments, the output signals of the one or more splitters used on chip 200 may each be carried by individual single-mode solid-core waveguides that intersect channel 206 at equally-spaced, precisely defined locations over a length of excitation zone 204.

As shown in FIG. 2B, greater than 90% of input power to an optical splitter in some embodiments may be transferred to the two ends of the splitter, for example using a solid-core ARROW waveguide. In some embodiments, the percentage of power transferred may be greater than or equal to 80%, 85%, 90%, 95%, or 99%. In some embodiments, the percentage of power transferred may be less than or equal to 99.9%, 99%, 95%, 90%, or 85%. FIG. 2C shows a photograph of an optical splitter having one input and two outputs (a "y-splitter") implemented using solid-core ARROWs. One or more of the critical dimensions (e.g., curvature radii, core width, etc.) of the splitter may be optimized to minimize loss in optical power. N y-splitters in series may be used to create $k=2^N$ excitation spots; in some embodiments, chips may be produced with k=1, 2, 4, or 8 excitation spots.

In some embodiments, alternate or additional components and/or techniques may be used to create multiple excitation spots for a chip such as chip 200. For example, multi-spot excitation may be achieved using a series of parallel waveguides that are excited by a linear fiber array. In some embodiments, the parallel waveguides may be curved in order to reduce the spacing from a larger spacing distance to a smaller spacing distance. In some embodiments, the greater spacing distance may be greater than or equal to 50 µm, 100 µm, 150 µm, 250 µm, or 500 µm. In some embodiments, the greater spacing distance may be less than or equal to 75 µm, 100 µm, 150 µm, 250 µm, 500 µm, or 1000 µm. In some embodiments, the lesser spacing distance may be greater than or equal to 1 µm, 2 µm, 5 µm, 10 µm, 20 µm, or 50 µm. In some embodiments, the lesser spacing distance may be less than or equal to 2 µm, 5 µm, 10 µm, 20 µm, 50 µm, or 100 µm. In some embodiments, the larger spacing distance may be about 125 µm at the fiber input end and the smaller spacing distance may be about 10 µm at the liquid channel. In some embodiments, the parallel waveguides may comprise but S-like bends, which may exhibit lower loss than y-splitters having abrupt direction changes. In some embodiments, using parallel and/or curved waveguides that independently carry light in a side-by-side manner with respect to one another may be less lossy than using a series of y-splitters, and/or may be easier and more efficient to fabricate.

As another example, in some embodiments, excitation spots may be created by using interference-based multimode waveguides called multi-mode interferometers (MMIs), which may in some embodiments be integrated into chip 200 and configured such that the MMI waveguide intersects channel 206 at the excitation zone, causing a plurality of interference-based excitation spots to be incident on channel 206. In embodiments in which MMI waveguides are used to create multi-spot excitation, excitation at different light frequencies and different locations may also be achieved by creating multiple interference-based spot patterns in the same MMI using excitation light at different wavelengths. In some embodiments, excitation at different frequencies may allow for additional spectral information to be obtained. For example, multicolor electrophoresis with four or five colors using MMI waveguides may be used for DNA analysis. In some embodiments, use of MMI waveguides may be simpler than other embodiments that rely on the use of spectrally selective optical elements such as dichroic mirrors to separate emitted signals. In any event, for applicability to the multi-spot velocimetry-based techniques disclosed herein, a user or system must simply know the spacing of the excitation spots (whether created by optical splitters or by MMI waveguides) in order to be able to accurately determine particle velocity.

In some embodiments, a system such as chip 200 may be configured to determine a particle identity based on one or both of velocimetry analysis and spectral-based analysis. For example, in some embodiments multiple spot patterns may be caused to be incident on a fluidic channel, wherein the spot patterns have different spacings of spots and/or different numbers of spots. In some embodiments, different spot patterns may comprise excitation light of different wavelengths, such that certain particles in the fluidic channel may be excited by spots of one spot pattern but not another. By detecting fluorescence signal spikes as a particle passes by spots of a spot pattern, the system may determine a spacing of the signal spikes and/or a count of the signal spikes in order to determine whether the signal spikes are attributable to a first spot pattern or to a second spot pattern, wherein the first and second spot patterns have different spot spacings and/or different numbers of spots. Based on the determination as to which spot pattern has excited a particle, an identity of the particle may then be determined on the basis that the certain types of particles are known to be excited by light of the wavelength of one spot pattern but not the other.

In some embodiments, spectral-based particle identification (and/or separation) may be used together with velocimetry-based particle identification (and/or separation). In some embodiments, particles may be identified first on the basis of spectral-based analysis, and the identification may then be confirmed by velocimetry-based analysis. In some embodiments, particles may be identified first on the basis of velocimetry-based analysis, and the identification may then be confirmed by spectral-based analysis. In some embodiments, particles may be identified based on velocimetry-based analysis and spectral-based analysis simultaneously.

In some embodiments, rather than the spot pattern being generated by waveguides or other components located on a planar system such as a chip, a spot pattern may be generated off-chip and directed onto the chip by free-space optics.

In addition to the components of chip 200 discussed above, chip 200 may further comprise one or more integrated light detectors, sensors, cameras, and/or image capture-devices, disposed on substrate 101, configured to detect fluorescence emission from particles in channel 206 having been excited in excitation zone 204.

In some embodiments, detection of fluorescence emission may be enabled in chip 200 by use of integrated liquid core waveguides (such as ARROW waveguides) with fully planar beam paths, which may be integrated into chip 200 using on-chip photodetectors. For example, detection of fluorescence emission may comprise collecting generated light that is transmitted parallel to a plane of the substrate or chip, wherein the light has been guided to an edge of the system or device. In some embodiments, integrated liquid-core waveguide detection may be desirable for single molecule detection due to their high efficiency, sensitivity, and inherent advantages of integrated optics. When used with laser induced fluorescence techniques, minute amounts of fluorescently labeled analytes may be detected with high efficiency and precision by systems using integrated liquid core waveguides. In some embodiments, off-chip photodetection may be used, such as by observing a channel with one or more microscope objectives. For example, an objective or fiber may be placed next to a chip and used to guide light from the chip to an off-chip detector.

While the example of system 200 in FIG. 2A shows only a single fluidic channel (channel 206), some embodiments may comprise more than one fluidic channel which may be simultaneously used. For example, some embodiments may comprise multiple parallel channels that may be intersected by the same waveguide(s) so that particles flowing through the multiple channels may be simultaneously tested. This arrangement may improve throughout, and, in the case of using MMI waveguides, may allow for identification of the different channels due to the different interference-based spot patterns that would be incident on the different channels.

Furthermore, in some embodiments, chip 200 may comprise one or more computers and/or microprocessors disposed on substrate 201. In some embodiments, one or more onboard processors may be configured to execute instructions for performing any of the techniques discussed herein, in whole or in part, including controlling operation of chip voltage, opening and/or closing valves, operating excitation light sources, operating optical detection/sensor devices, processing and/or transforming collected data, storing data, and/or transmitting data. For example, in some embodiments, one or more onboard processors may be configured to collect data forming a raw signal such as raw signal 140 and to transform it into a transformed signal such as transformed signal 142. In some embodiments, any one or more of the techniques discussed herein may be performed, in whole or in part, by one or more processors located remotely from an integrated chip such as chip 200; in these embodiments, chip 200 may be configured to send and/or receive data to/from these processors, such as by wired communication, wireless communication, and/or any suitable network communication protocol.

In some embodiments, single-particle velocimetry-based identification and/or separation may be used to determine a number or one or more types of particles included in a mixture, wherein the mixture may have a mix of a plurality of different types of particles.

Figure 2D:
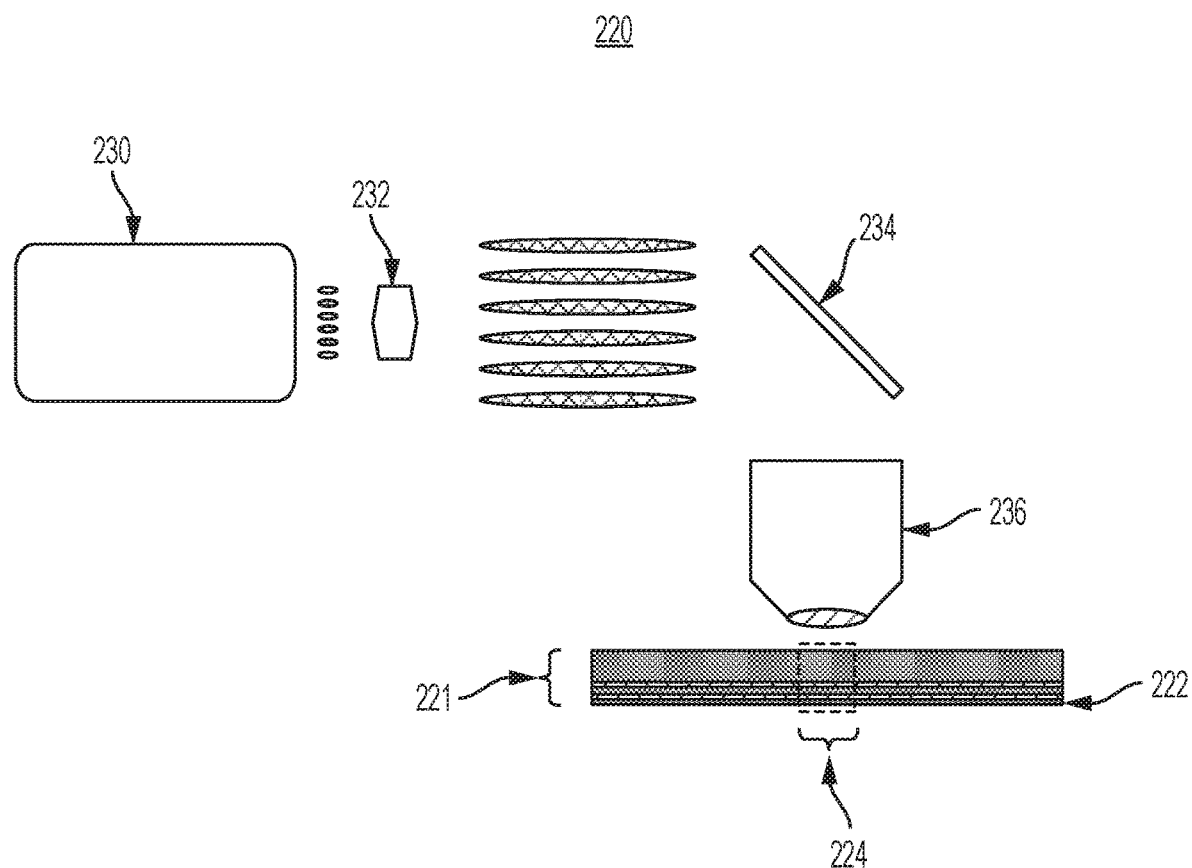
FIGS. 2D & 2E are schematic views of a system including an optofluidic chip for single-particle velocimetry-based identification and/or separation, in accordance with some embodiments, in accordance with some embodiments.
Figure 2E:
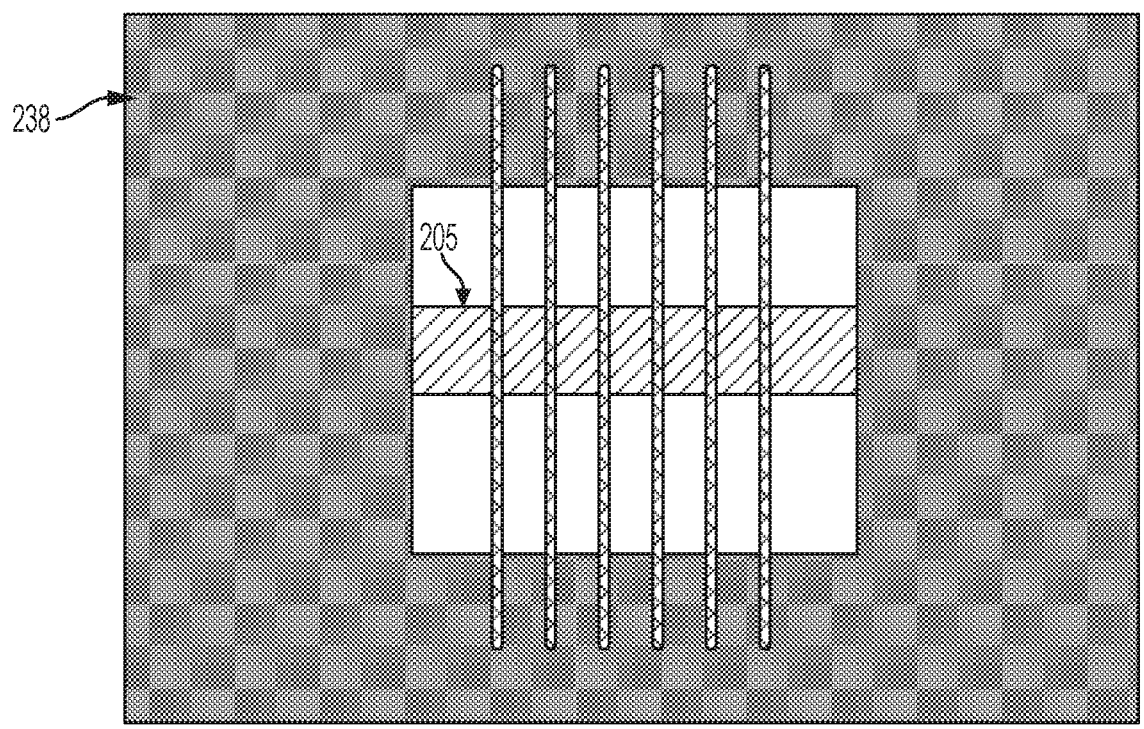

FIGS. 2D & 2E show a schematic views of system 220 including chip 221, which may be an optofluidic chip for single-particle velocimetry-based identification and/or separation. In some embodiments, chip 221 may share any one or more characteristics in common with chip 200 discussed above with reference to FIG. 2A. While chip 200 in FIG. 2A depicts on-chip creation of an excitation spot pattern using on-chip splitters 208a-c, chip 220 in FIG. 2D depicts an alternate technique for creating an excitation spot patter to be incident on a fluidic channel in the chip. Namely, FIG. 2D depicts an out-of-plane illumination technique by which off-chip generation of a light pattern is used such that the light pattern may be directed toward and onto chip 221 to form an excitation spot pattern when the light pattern intersects with a fluidic channel of chip.

As shown in FIG. 2D, a spot pattern (having six, evenly-spaced spots, in the example shown) is generated by light pattern generator 230. In some embodiments, light pattern generator 230 may be a chip containing optical waveguide splitters, a multimode interference waveguide, a grating, a fiber bundle, or any suitable device or system configured to generate a light pattern out of the plane of chip 221. As shown in FIG. 2D, the pattern generated by light pattern generator 230 may be passed through one or more lenses such as lens 232, and may be directed toward the plane of chip 221 by one or more mirrors and/or dichroic filters such as mirror 234. Finally, as shown in FIG. 2D, the light pattern may be directed toward and onto a transparent surface of chip 221 by one or more objectives such as objective 236, thereby creating an excitation spot pattern at the intersection of the light pattern and a fluidic channel of chip 221. In some embodiments, chip 221 may further comprise reflective layer 222, which may optionally be included below a fluidic channel of chip 221 (e.g., as a bottom layer of chip 221) and configured to reflect excitation light back up and toward the channel after passing through it. While FIG. 2D shows an embodiment using lenses and mirrors as well as perpendicular incidence onto chip 221, other configurations are possible.

As shown in FIG. 2E, in some embodiments, chip 221 may further comprise an opaque layer 238 (this layer may also be referred to as "black layer") on top of chip 221. Opaque layer 238 may include any opaque material such that light from above may not pass through solid portions of opaque layer 238, which may be achieved by one or more of absorption, scattering, or reflection. In some embodiments, opaque layer 238 may comprise metal. In some embodiments, opaque layer 238 may comprise an absorbing, but not reflecting material. In some embodiments, opaque layer 238 may block most light incident onto the top of chip 221, while allowing light to pass through an opening (shown in the example of FIG. 2E as a single rectangular opening) that contains the channel 205 to be illuminated. As shown, the opening may allow an illumination pattern to consist of long lines (e.g., the pattern of vertical lines representing an illumination pattern as shown) to minimize alignment requirements relative to the width of the channel. Opaque layer 238, outside the opening, may minimize unwanted optical signals due to excitation light scattering or fluorescence from the chip itself.

Figure 2F:
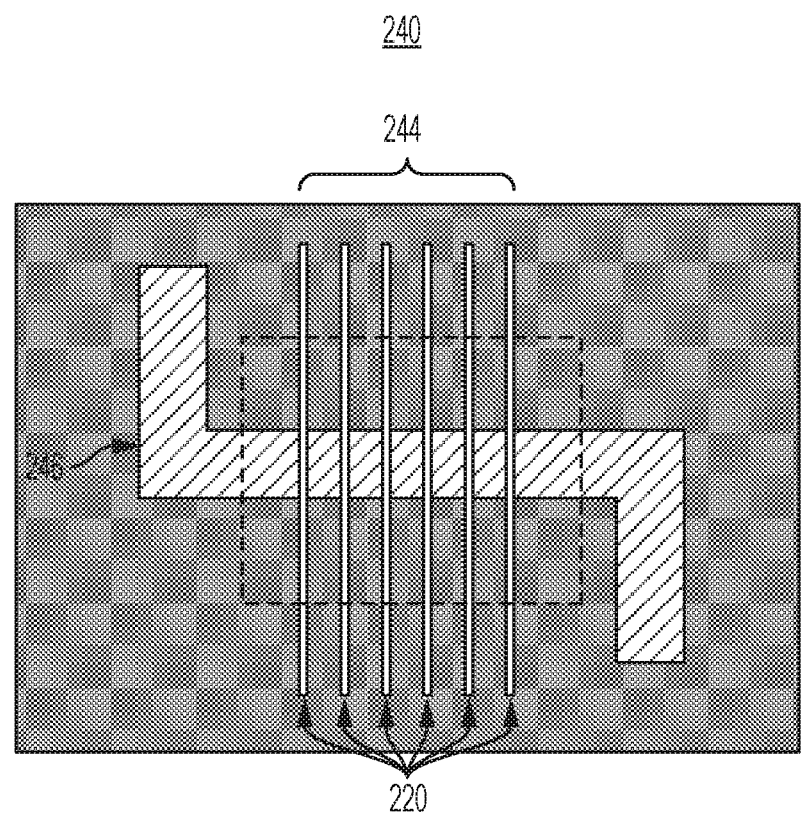
FIGS. 2F & 2G are schematic views of a system a system including an optofluidic chip for single-particle velocimetry-based identification and/or separation, in accordance with some embodiments, in accordance with some embodiments.
Figure 2G:
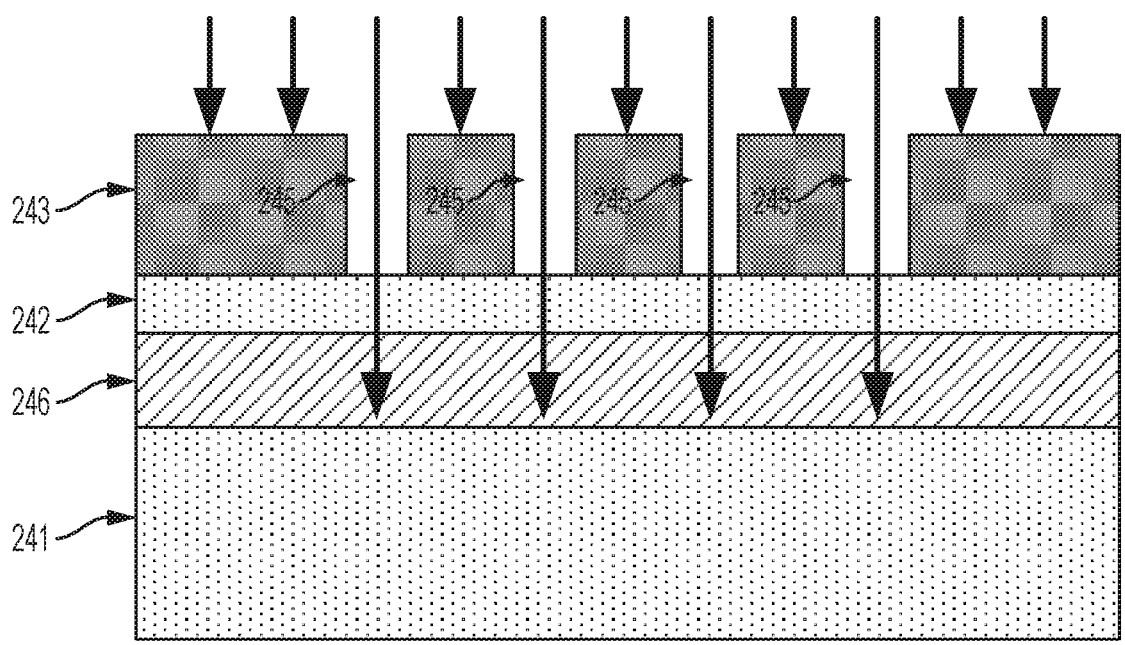

FIGS. 2F and 2G show schematic views of chip 240, which may be an optofluidic chip for single-particle velocimetry-based identification and/or separation. In some embodiments, chip 221 may share any one or more characteristics in common with chip 200 discussed above with reference to FIG. 2A. FIGS. 2F and 2G demonstrate yet another technique for creating an excitation spot pattern, different from the techniques shown in FIG. 2A and in FIG. 2D. Namely, chip 240 of FIGS. 2F and 2G use an opaque layer 243 (this layer may also be referred to as "black layer") on top of chip 240 to block most light incident onto the top of chip 240, while allowing light to pass through a plurality of openings 245 in opaque layer 243, such that the light passing through the plurality of openings creates an excitation spot pattern.

As shown in FIGS. 2F and 2G, chip 240 may include fluidic channel 246, which may share any one or more characteristics in common with other fluidic channels discussed herein. As shown in FIG. 2G, fluidic channel 246 may be located between substrate layer 241 and channel top layer 242. In some embodiments, channel top layer 242 may be translucent or transparent in order to allow the passage of excitation light from the top of chip 240 down and onto channel 246. As shown in FIG. 2G, chip 240 may include opaque layer 243, which may share any one or more characteristics in common with opaque layer 238 discussed above with reference to FIGS. 2D and 2E. In some embodiments, opaque later 243 may be disposed above channel 245 and may include any opaque material such that light from above may not pass through solid portions of opaque layer 243, which may be achieved by one or more of absorption, scattering, or reflection. In some embodiments, opaque layer 243 may comprise metal. In some embodiments, opaque layer 243 may comprise an absorbing, but not reflecting material. As shown, opaque layer 243 may include one or more openings 245, which may be arranged in any suitable spatial patterns such that light passing through openings 245 and otherwise blocked by opaque layer 243 may form an excitation spot pattern in excitation zone 244 incident on channel 246. In some embodiments, opaque layer 243 can be illuminated with a large light spot (e.g., the rectangular area in FIG. 2F), thus requiring very little alignment of the external light source with respect to chip 240 to generate the desired excitation spot pattern.

FIGS. 3A-3D describe data analysis in accordance with single-particle velocimetry-based identification and/or separation, and show how the systems and techniques described herein may be used to sort individual particles into bins based on their individual velocities in order to count a number of each of a plurality of types of particles. In some embodiments, the exemplary data collected and analyzed as shown in FIGS. 3A-3D may be collected and/or analyzed by a single-particle velocimetry-based identification and/or separation system such as system 120 or system 200 described above.

Figure 3A:
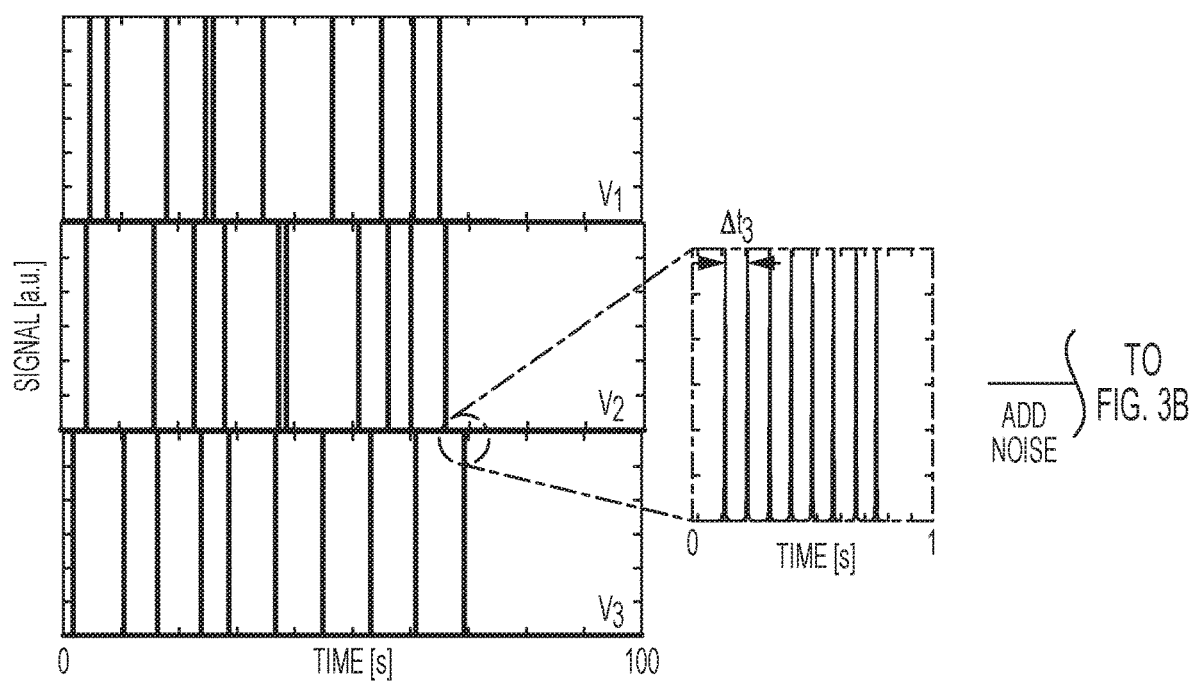
FIG. 3A is a depiction of signals corresponding to a plurality of particles having various velocities, in accordance with some embodiments.

FIG. 3A is a depiction of signals corresponding to a plurality of particles having various velocities, in accordance with some embodiments. Namely, the exemplary data depicts a sequence of 30 particles with 3 different velocities passing an excitation region at different times. The top third of the image shows vertical lines representing signals for particles having a first velocity $v_1$; the middle third of the image shows vertical lines representing signals for particles having a second velocity $v_2$; and the bottom third of the image shows vertical lines representing signals for particles having a third velocity $v_3$. The inset is a zoom-in into a single particle signal showing that the vertical line consists of k fluorescence bursts, one burst corresponding to the particle passing each of the excitation spots (here, 8 spots) of the system. Each particle produces k=8 fluorescence bursts as it passes the excitation region. The different time scale used for the inset should be noted. It should be further noted that the signals in FIG. 3A do not show the particles arriving in groups according to their velocities; rather, the individual particles may pass the excitation zone in any order with respect to their individual velocities.

In some embodiments, the signals shown in FIG. 3A represent data collected by a system and in an environment having negligible background noise, such that each of the signals shown in FIG. 3A is clearly visible. In some environments, however, data may be collected and/or analyzed in the presence of noise.

Figure 3B:
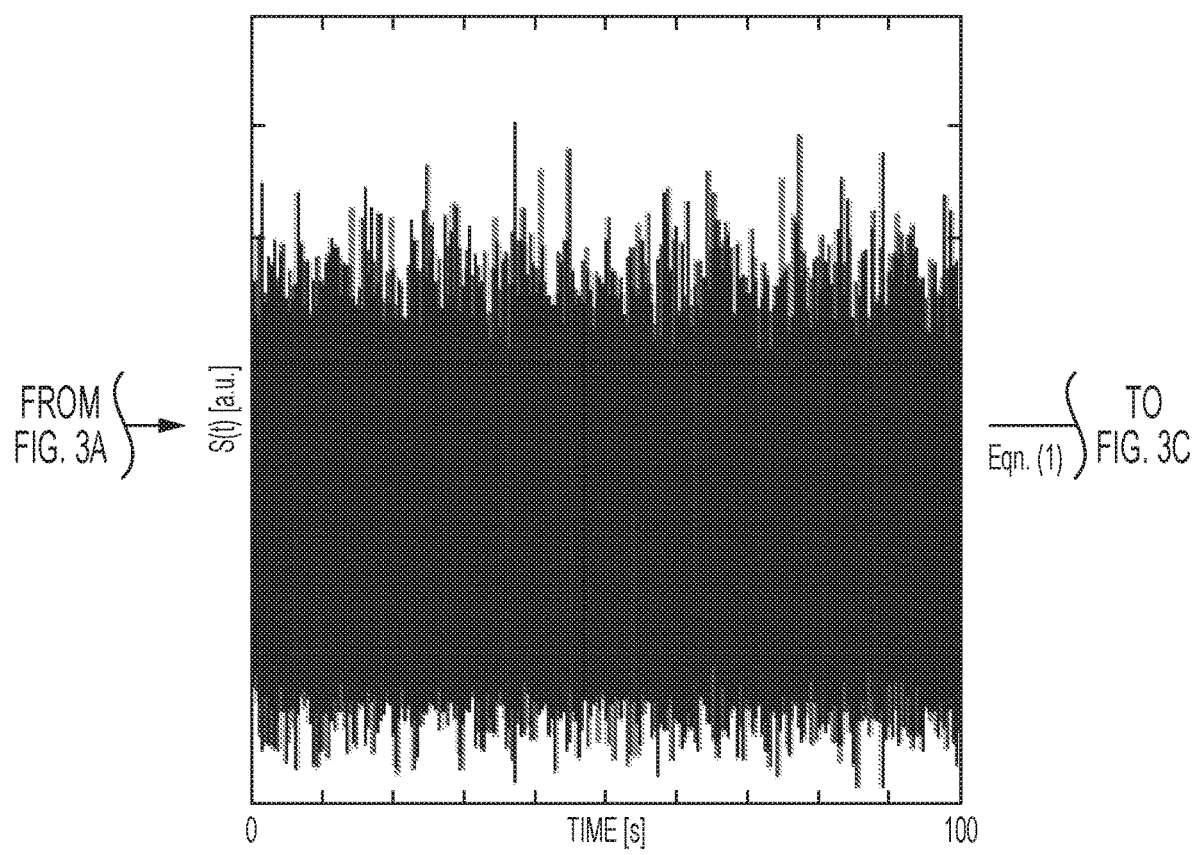
FIG. 3B is a depiction of noise along with signals corresponding to a plurality of particles having various velocities, in accordance with some embodiments.

FIG. 3B is a depiction of noise along with signals from FIG. 3A. In some embodiments, FIG. 3B may represent actual collected data, or it may represent a simulated detector signal S(t) after noise has been added. In either event, the signal and noise in FIG. 3B may be such that signals attributable to individual particles are not readily visible.

In some embodiments, processing of data, such as by equation 1 as discussed above, may be used to extract meaningful and usable data from a noisy signal. That is, a noisy signal in which data attributable to individual particles is not readily identifiable may be processed to extract clear signal spikes representing the times at which various particles having different velocities passed through the excitation zone.

Figure 3C:
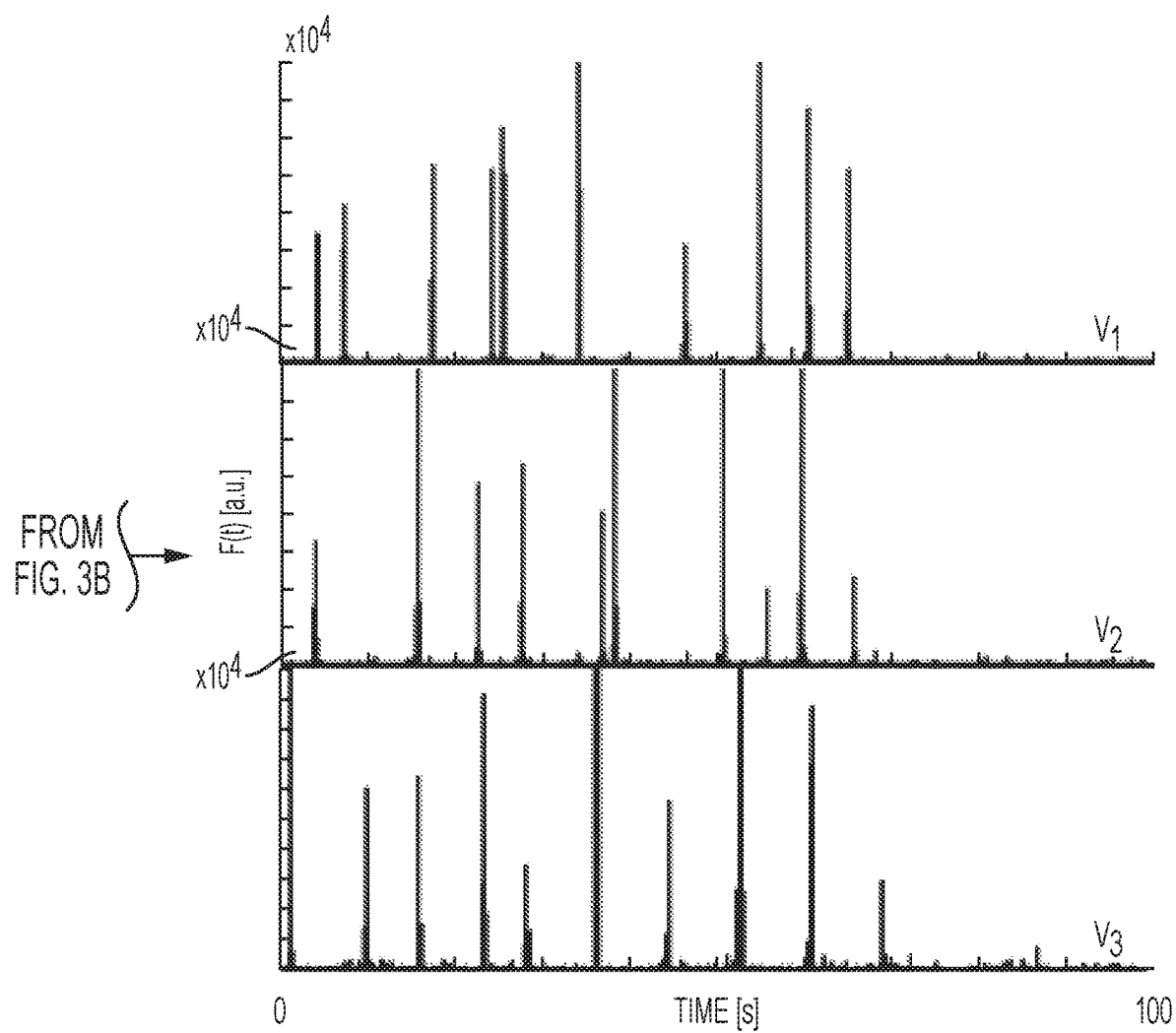
FIG. 3C is a depiction of extracted data representing a plurality of particles having various velocities, in accordance with some embodiments.

FIG. 3C is a depiction of extracted data extracted from the noisy data of FIG. 3B via application of equation 1. Thus, FIG. 3C represents successful retrieval and velocity determination for the 30 particles shown in the noiseless signal of FIG. 3A. In some embodiments, a raw fluorescence signal such as the signal represented by FIG. 3B may be analyzed by applying equation 1 (or a similar data processing algorithm) with different burst delay times Δt until particles are identified with highest fidelity for the correct Δt. The particle velocity $v_p$ may then be determined immediately as $v_p=\Delta L/\Delta t$.

In the example of FIG. 3C, the transformed signal may be achieved by applying equation 1 to the signal of FIG. 3B with the correct respective time-delays corresponding to each of the three velocities. That is, applying equation 1 with Δt=50 ms, 70 ms, and 90 ms may achieve the transformed signals for $v_1$=180 μm/s, $v_2$=130 μm/s, and $v_3$=100 μm/s, respectively, with ΔL=9 μm. In FIG. 3C, the transformed signal corresponding to the ten particles having $v_1$ is shown in the top third of the figure, the transformed signal corresponding to the ten particles having $v_2$ is shown in the middle third of the figure, and the transformed signal corresponding to the ten particles having $v_3$ is shown in the bottom third of the figure. It may be readily apparent that the transformed signals shown in FIG. 3C represent a successful retrieval/representation of the noiseless signals shown in FIG. 3A.

In some embodiments, a finite observation time may set the lower limit of detection (LoD). For a somewhat arbitrary boundary of detecting 1 particle ($v_p$=100 μm/s) during a 15 minute assay, this lower LoD translates to a concentration of 0.3 aM (170/mL) for a channel cross section area of 5×12 μm. The high concentration limit may be approximately defined by the passing of two identical particles simultaneously through the excitation region. For typical chip parameters ($V_{exc}$~4.5 pL), the high concentration limit may be approximately 370 fM. Therefore, a dynamic range of at least 6 logs may be achieved using systems and/or techniques disclosed herein. In some embodiments, this range may be further extended by diluting the sample used. In some embodiments, in order to assess velocity resolution, temporal widths of the fluorescence bursts may be analyzed.

Finally, after processing the noisy data to retrieve the clear signal spikes representing the times of arrival for each particle, the velocity of each spike in the signal may be observed in order to determine an identity of each particle according to its velocity. In some embodiments, determined velocity may be used to determine an identity or type of a particle by comparing the measured velocity with a calculated velocity for a certain type of particle. For example, expected particle velocity may be calculated based on particle mass, particle charge, and system characteristics such as voltage applied, fluid viscosity, channel size, fluid flow rate, etc.

Alternately or additionally, determined velocity may be used to determine an identity or type of a particle by comparing the measured velocity with a previously measured velocity for a certain type of particle. For example, measured particle velocities may be compared to a look-up table (or any other suitable data structure stored in a database or other computer storage) for expected particle velocities under the same conditions as applied by the system (e.g., same fluid in channel, same channel size, same voltage applied to channel, etc.) The look-up table can be created by sending a variety of known particles through the system under know conditions. The velocity of these particles can then be added to the table and used to identify unknown particles that are sent through the system under the same conditions based on their velocity.

Further alternately or additionally, determined velocity may be used to determine an identity or type of a particle by comparing the measured velocity with a simultaneously measured velocity of a reference particle being subjected to the same techniques under the same or similar conditions; for example, a chip may include one or more reference channels through which known kinds of particles are run in addition to an experimental channel through which unknown kinds of particles are run, and the velocity determined for the unknown particles in the experimental channel may be compared to velocities measured for the known kinds of particles in the one or more reference channels.

Further alternately or additionally, determined velocity may be used to determine an identity or type of a particle by physically separating/sorting particles determined to have different velocities (discussed further below) and by then performing additional analysis on the sorted particles. For example, if particles having a certain velocity are physically isolated from other types of particles, then a mass spectrometer may be used to determine information about the type and/or identity of the isolated particles.

Further alternately or additionally, determined velocity may be used to determine an identity or type of a particle by comparing the relative measured velocities of multiple types of particles, without necessarily using the absolute velocities to determine identity. For example, if a mixture is known to contain two kinds of particles where one has a greater electrokinetic mobility than the other, then a system may determine that particles having a faster relative velocity are the particle type with the greater mobility, and that particles having a slower relative velocity are the particle type with the lesser mobility. While absolute velocities may vary with different mixture compositions (e.g., different viscosities), electric field, and other experimental conditions, the relative velocity comparison may nonetheless allow differentiating between two or more types of particles that are known to be included in a plurality of particles being observed.

In some embodiments, an indication of the determined velocity and/or the determined type of particle may be stored in computer storage, transmitted to another device or system component, displayed, and/or output or indicated to a user in any way. In some embodiments, a system may be configured to count the number of each type of detected particle, such as by sorting the detected particles into bins for particles having common velocities; these counts may be stored, transmitted, displayed, and/or outputted in any manner.

Figure 3D:
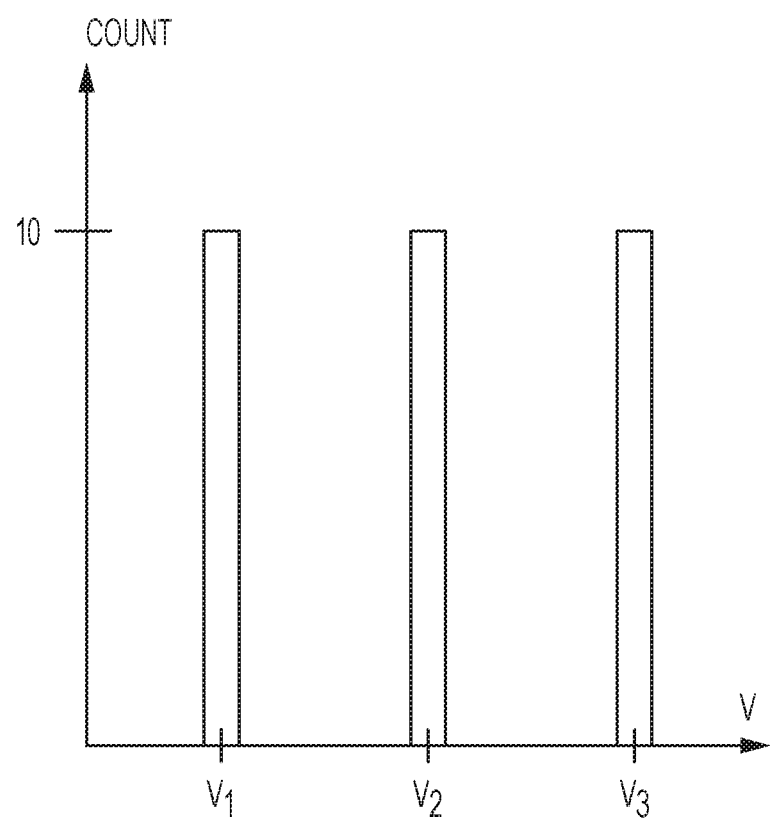
FIG. 3D is a depiction of a histogram sorting a plurality of particles according to their velocities, in accordance with some embodiments.

FIG. 3D is a depiction of a histogram sorting the detected particles based on the transformed signal of FIG. 3C into three bins, with one bin each corresponding to $v_1$, $v_2$, and $v_3$. As shown in FIG. 3D, the histogram represents that ten particles corresponding to each of the three velocities are detected. In some embodiments, a histogram such as the one shown in FIG. 3D, and/or any other data representing detected and processed data, may be stored, transmitted, displayed, and/or otherwise output by a system such as any of the systems described herein. In some embodiments, any data representing a determined velocity of a detected particle and/or a determined identity or other characteristic of a detected particle may be stored, transmitted, displayed, and/or otherwise output.

In some embodiments, a detected and/or determined velocity of a particle may be used to control one or more system components, such as components used to physically sort particles having different velocities by separating them from one another. For example, in some embodiments, a system such as system 120 or chip 200 may be configured to automatically detect and determine a velocity of a particle as discussed above, and to then send a control signal to one or more system components to cause the component to physically sort the particle.

For example, in some embodiments, a system may be configured to control one or more valves to control the flow of particles along a certain flow path, such that particles may be caused to flow along one flow path if their velocity meet predefined criteria and to flow along another flow path if their velocity does not meet the predefined criterial. In some embodiments, particles faster than a threshold velocity may be separated from particles slower than a threshold velocity, while in some embodiments multiple ranges and/or thresholds may be applied to separate a mixture of particles into more than two outputs. For example, a microfluidic channel such as channel 126 or channel 206 may in some embodiments diverge into one or more output channels following an excitation zone, and the system may control one or more valves to direct particles along a desired output channel.

In addition to or alternately to controlling valves in order to physically sort particles from one another, a system may be configured to control one or more electric fields in order to physically sort particles from one another. For example, in an arrangement where a microfluidic channel such as channel 126 or channel 206 diverges following an excitation zone, one or more electrical fields may be activated, deactivated, increased, decreased, modulated, or otherwise controlled in order to cause the flow of a particle along a desired output channel. For example, in some embodiments, an electrical field may in some embodiments be activated to pull a particle into and/or along one output channel and away from another output channel.

Whether controlling valves, electrical fields, or any other system components used to physically sort particles from one another, a system such as system 120 or chip 200 may be configured to control the system components in a sufficiently fast and precise manner so as to accurately sort individual particles. That is, in order to accurately sort individual particles, a system must be configured to control system components in a fast enough manner to direct the measured particle (and not another particle in the mixture) along a desired output flow path. While the required speed for controlling system components for particle separation/sorting may vary in accordance with particle concentration and with other system characteristics (e.g., electrical field applied, channel length, etc.), a system may in some embodiments be configured to send a control signal to a system component after detecting a particle and determining its velocity within a processing time of less than 50 microseconds, 100 microseconds, 250 microseconds, or 500 microseconds. In some embodiments, the processing time may be greater than 1 microsecond, 10 microseconds, 25 microseconds, or 50 microseconds.

In some embodiments, the determination of particle velocities as disclosed herein may be used with chemically and biologically relevant assays of increasing complexity. For example, a mixture of fluorescently labeled amino acids may be separated in accordance with the methods disclosed herein. As a specific example, a mixture of FITC-labeled glycine, phenylalanine, and arginine that has previously been used to demonstrate conventional capillary electrophoresis in ARROW-like microchannels may be separated in accordance with the methods and systems disclosed herein. As another example, the systems and methods disclosed herein may be used to detect, classify, and separate a set of proteins (e.g., a group of four cancer biomarkers in blood serum (AFP, CEA, CytC, and HSP90)) in a complex mixture. Commercially available serum from healthy, de-identified individuals may be lysed, size-filtered to exclude particles >3 μm, and spiked with fluorescently labeled proteins. Processing that assay in accordance with the methods and systems disclosed herein may have an LoD that is at least 104 times better than the ~1 ng/mL typically achieved with chip-based CE.

Applications of this type may enable techniques for fluorescence-based particle detection and identification on a chip based on measuring the velocity of single particles rather than separations of particle bunches (plugs). This approach may overcome limitations of plug-based capillary electrophoresis and may be applicable to a wide range of biomolecules ranging from small molecules (e.g. proteins, metabolites) to large microorganisms (e.g. virus particles). Its low limit of detection may make it ideal for detection of molecular biomarkers at low copy and cell numbers for a broad range of diagnostic applications. In some embodiments, application of the systems and/or methods disclosed herein may result in a performance leap for on-chip molecular detection that improves LoD by ~7 orders of magnitude over known CE systems and methods if 50 detected particles in a 15-minute single-channel assay are used as a lower LoD boundary, for example by improving LoD from $10^{12}$/mL for known CE system to $10^5$/mL for analysis performed in accordance with the systems and methods disclosed herein.

In some embodiments, the systems and methods disclosed herein may be applicable for low-concentration biomolecule detection. Particles may be fluorescently labeled and specificity may be provided by the velocity discrimination so that free dye does not need to be removed prior to readout. Specifically, separations using the systems and methods disclosed herein may be applicable to DNA fragment sizing, amino acid detection, and protein detection.

Regarding DNA fragment sizing, a benefit of applying the systems and methods disclosed herein to DNA analysis may be the elimination of the need for PCR target amplification before detection. In some embodiments, a resolution of ~10 base pairs may be achieved, assuming an applied voltage of 100V and an interrogation region of L=250 μm. In some embodiments, this limit of detection may be verified by filling a channel with low viscosity linear polyacrylamide (LPA) gels and running mixtures of fluorescently labeled DNA fragments of different length through the channel, and using serial dilutions to determine the limit of detection and different DNA mixtures to determine the base pair resolution.

Regarding amino acid detection, the systems and methods disclosed herein may be applied to low-concentration amino acid analysis, including but not limited to analysis and separation of Arg, Val, Thr, Asn, Ser, Ala, Gly, Glu, and Asp from a single mixture. In some embodiments, a limit of detection of 36 ag/mL (10 particles detected in 15 minutes at a velocity of 1 mm/s), may be achieved. This is about 8 orders of magnitude lower than previously demonstrated limits of detection.

Regarding protein detection, ultra-low concentration detection of proteins may be important to the rapidly growing field of early cancer biomarker detection. In some embodiments, the systems and methods disclosed herein may be used to separate various commercially available cancer protein biomarkers, including but not limited to AFP, CEA, CytC, and HSP90. In some embodiments, cancer protein biomarkers may be separated in carbonate buffer at various relative concentrations, with a $10^3$ lower LoD compared to the low ng/mL achieved with chip-based CE.

Figure 4:
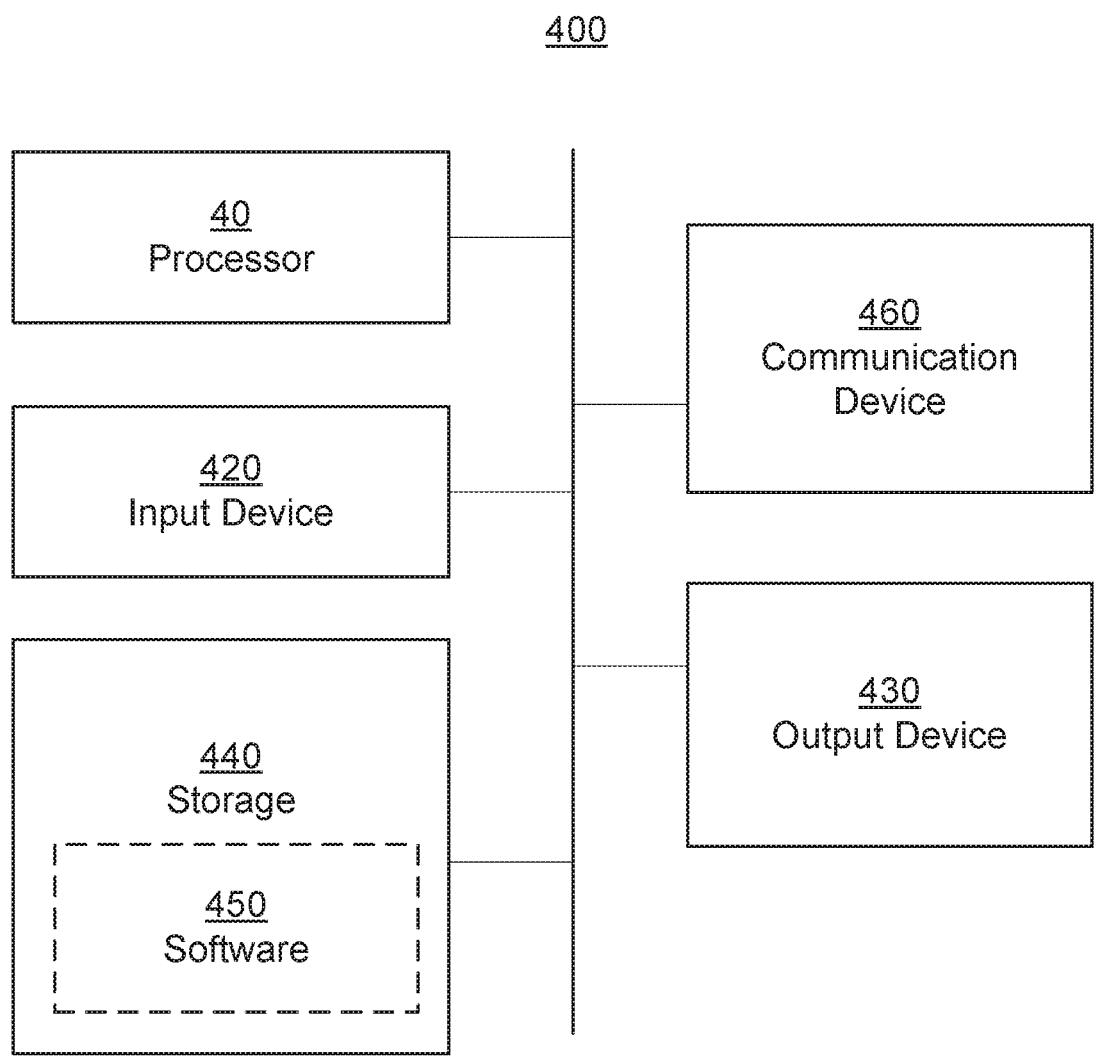
FIG. 4 is a depiction of a computer, in accordance with some embodiments.

FIG. 4 illustrates an example of a computer in accordance with one embodiment. Computer 400 can be a component of a chip or other system for capillary electrophoresis and/or single-particle velocimetry-based identification and/or separation, such as system 100, system 120, and/or chip 200. In some embodiments, computer 400 is configured to execute a method for single-particle velocimetry-based identification and/or separation, such as by controlling one or more chips and/or other systems for single-particle velocimetry-based identification and/or separation as discussed above.

Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460.

Input device 420 can be any suitable device that provides input, such as a touch screen or monitor, keyboard, mouse, or voice-recognition device. Output device 430 can be any suitable device that provides output, such as a touch screen, monitor, printer, disk drive, or speaker.

Storage 440 can be any suitable device that provides storage, such as an electrical, magnetic, or optical memory, including a RAM, cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods or techniques described herein, such as methods or techniques for automated control of any one or more of the systems, chips, and/or devices described herein.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can include a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. The illustrative embodiments described above, however, are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A system for identifying a particle based on a velocity of the particle, comprising:
    a substrate;
    a fluidic channel disposed on the substrate;
    a voltage source;
    one or more optical components;
    one or more optical sensors;
    one or more processors; and
    a non-transitory computer-readable storage medium storing instructions which, when executed by the one or more processors, cause the system to perform the following:
        generating, by the voltage source, an electrical field that induces electrophoretic or electroosmotic flow of a particle labeled with a fluorophore in a mixture through the channel;
        illuminating the channel, by the one or more optical components, to form an excitation spot pattern that is incident on the channel, and that optically excites the particle as the particle flows past the excitation spot pattern;
        detecting, by the one or more optical sensors, a plurality of signal spikes emitted by the particle in response to the particle being illuminated by the excitation spot pattern, wherein the plurality of signal spikes comprises a first fluorescence signal spike emitted by the particle in response to the particle being illuminated by the excitation spot pattern and a second fluorescence signal spike emitted by the particle in response to the particle being illuminated by the excitation spot pattern;

calculating a velocity of the particle based on the plurality of signal spikes; and determining an identity of the particle based on the calculated velocity.

2. The system of claim 1, wherein the instructions that cause the system to determine the identity of the particle comprise instructions for determining a molecular makeup of the particle.

3. The system of claim 1, wherein the instructions that cause the system to determine the identity of the particle comprise instructions for determining a type of particle to which the particle corresponds.

4. The system of claim 1, wherein the instructions that cause the system to determine the identity of the particle comprise instructions for determining whether the particle is a same type of particle as a second particle.

5. The system of claim 1, wherein the instructions that cause the system to determine the identity of the particle comprise instructions for matching the calculated velocity to a previously-measured velocity of a second particle, wherein the previously-measured velocity is retrieved from a look-up table.

6. The system of claim 1, wherein the instructions that cause the system to determine the identity of the particle comprise instructions for matching the calculated velocity of the particle to a theoretically calculated velocity for a type of particle.

7. The system of claim 1, wherein the excitation spot pattern comprises a first excitation spot incident on the channel at a first location and a second excitation spot incident on the channel at a second location spaced apart from the first location by a spacing distance.

8. The system of claim 7, wherein the instructions that cause the system to calculate the velocity of the particle comprise instructions for determining a time difference between a time at which the first fluorescence signal spike was detected and a time at which the second fluorescence signal spike was emitted, and calculating the velocity based on the time difference and the spacing distance.

9. The system of claim 7, wherein the spacing distance is less than 20 cm.

10. The system of claim 1, wherein the one or more optical components comprise a light source, and the instructions further cause the system to generate, by the light source, a spot pattern remote from the substrate.

11. The system of claim 1, wherein the one or more optical components comprise one or more waveguides disposed on the substrate.

12. The system of claim 11, wherein the one or more waveguides comprise one or more optical splitters, and the instructions further cause the system to split, by the one or more optical splitters, a single optical input into a plurality of optical outputs.

13. The system of claim 12, wherein the one or more optical splitters comprise a plurality of optical splitters arranged in series, and the instructions further cause the system to create, by the plurality of optical splitters arranged in series, an excitation spot pattern having two or more excitation spots.

14. The system of claim 11, wherein the one or more waveguides comprise a multi-mode interference waveguide that generates the excitation spot pattern as an interference-based spot pattern.

15. The system of claim 1, wherein the plurality of signal spikes are detected as part of a raw signal, and the instructions further cause the system to:

generate a transformed signal by calculating a time-shifted product of the raw signal with the raw signal; and calculate the velocity based on the transformed signal.

16. The system of claim 15, wherein the instructions that cause the system to calculate the time-shifted product of the raw signal with the raw signal comprise instructions for calculating the product using one factor per excitation spots in the excitation spot pattern.

17. The system of claim 1, wherein the instructions further cause the system to detect, by the one or more optical sensors, single particles comprising one or more of: an individual molecule, a particle included in single-cell lysate, an amino acid, a protein, a nucleic acid, a metabolite, a whole virus, a nucleic acid, and a metabolite.

18. The system of claim 1, wherein the one or more optical sensors comprise an integrated optical sensor disposed on the substrate, and the instructions further cause the system to collect, by the integrated optical sensor, the plurality of signal spikes via planar beam paths.

19. The system of claim 18, wherein the instructions further cause the system to collect, by the integrated optical sensor, the plurality of signal spikes via an integrated liquid core waveguide.

20. The system of claim 1, wherein the channel is less than 5 m in length.

21. The system of claim 1, wherein an internal volume of the fluidic channel excited by a spot of the spot pattern is less than 1 picoliter.

22. The system of claim 1, wherein the instructions further cause the system to generate, by the voltage source, an electrical field for inducing electrophoretic and electroosmotic flow of the particle in the channel.

23. A system for separating particles based on individual particle velocity, comprising:

a substrate;

a fluidic channel disposed on the substrate;

a voltage source;

one or more optical components;

one or more optical sensors;

a particle separation control component;

one or more processors; and a non-transitory computer-readable storage medium storing instructions which, when executed by the one or more processors, cause the system to perform the following:

generating, by the voltage source, an electrical field that induces electrophoretic or electroosmotic flow of a particle labeled with a fluorophore in a mixture through the channel;

illuminating the channel, by the one or more optical components to form an excitation spot pattern that is incident on the channel and that optically excites the particle as the particle flows past the excitation spot pattern;

detecting, by the one or more optical sensors, a plurality of signal spikes emitted by the particle in response to the particle being illuminated by the excitation spot pattern, wherein the plurality of signal spikes comprises a first fluorescence signal spike emitted by the particle in response to the particle being illuminated by the excitation spot pattern and a second fluorescence signal spike emitted by the particle in response to the particle being illuminated by the excitation spot pattern;

separating, by the particle separation control component, the particle from one or more other particles included in the mixture;

calculating a velocity of the particle based on the plurality of signal spikes;

directing, by the separation control component, the particle to flow to a first output location in accordance with a determination that the calculated velocity of the particle satisfies predefined criteria; and directing, by the separation control component, the particle to flow to a second output in accordance with a determination that the calculated velocity of the particle does not satisfy the predefined criteria.

24. The system of claim 23, wherein the separation control component comprises a valve, and the instructions further cause the system to open or close, by the valve, a flow path for the particle to flow from the channel to one of the first output and the second output.

25. The system of claim 23, wherein the separation control component comprises a second voltage source, and the instructions further cause the system to generate, by the second voltage source, a second electrical field configured to induce electrophoresis in the particle to cause the particle to flow from the channel to one or the first output and the second output.

26. The system of claim 23, wherein the channel is part of a hollow-core waveguide of a planar optofluidic platform disposed on the substrate.

27. A method for identifying a particle based on a velocity of a particle using a planar optofluidic system, the method comprising:

introducing a liquid mixture into a channel of the planar optofluidic system, wherein the mixture comprises a particle labeled with a fluorophore;

generating, by a voltage source of the planar optofluidic system, an electrical field configured to induce electrophoretic or electroosmotic flow of the particle along the channel;

illuminating the channel, by one or more optical components of the planar optofluidic system, to form an excitation spot pattern that is incident on the channel, and that optically excites the particle as the particle flows past an excitation spot pattern, wherein the excitation spot pattern comprises a first excitation spot and a second excitation spot;

detecting, by an optical detector of the planar optofluidic system, a plurality of signal spikes emitted by the particle in response to the particle being illuminated by the excitation spot pattern, wherein the plurality of signal spikes comprises a first fluorescence signal spike emitted by the particle in response to the particle being illuminated by the first excitation spot and a second fluorescence signal spike emitted by the particle in response to the particle being illuminated by the second excitation spot;

calculating, by one or more processors of the planar optofluidic system, based on the plurality of signal spikes, a velocity of the particle; and determining, by the one or more processors, based on the calculated velocity, an identity of the particle.

28. The method of claim 27, further comprising:

in accordance with a determination that the calculated velocity of the particle satisfies predefined criteria, directing, by a separation control component of the planar optofluidic system, the particle to flow to a first output location; and in accordance with a determination that the calculated velocity of the particle does not satisfy the predefined criteria, directing, by a separation control component of the planar optofluidic system, the particle to flow to a second output location.

29. A system for identifying a particle based on a velocity of the particle, comprising:

a substrate;

a fluidic channel disposed on the substrate;

a voltage source;

one or more optical components;

one or more optical sensors;

one or more processors; and a non-transitory computer-readable storage medium storing instructions which, when executed by the one or more processors, cause the system to perform the following:

generating, by the voltage source, an electrical field that induces electrophoretic or electroosmotic flow of a particle labeled with a fluorophore in a mixture through the channel;

illuminating the channel, by the one or more optical components, to form a first excitation spot pattern and a second excitation spot pattern that are incident on the channel and that optically excite the particle as the particle flows past one or both of the excitation spot patterns, wherein:

the first excitation spot pattern comprises light at a first wavelength;

the second excitation spot pattern comprises light at a second wavelength;

one or more of a number of spots and a spacing of spots is different in the first pattern and the second pattern;

detecting, by the one or more optical sensors, a plurality of signal spikes emitted by the particle in response to the particle being illuminated by the excitation spot patterns, wherein the plurality of signal spikes comprises a first fluorescence signal spike emitted by the particle in response to the particle being illuminated by one or more of the excitation spot patterns and a second fluorescence signal spike emitted by the particle in response to the particle being illuminated by the excitation spot patterns;

calculating a velocity of the particle based on the plurality of signal spikes;

calculating a spacing of the signal spikes based on the plurality of signal spikes; and determining an identity of the particle based on the calculated velocity and the calculated spacing.

30. The system of claim 29, wherein the spacing of the signal spikes is a time spacing indicative of a spacing distance between excitation spots in one of the excitation spot patterns.

31. The system of claim 29, wherein the instructions that cause the system to determine, based on the calculated spacing, an identity of the particle comprise instructions for:

determining that the calculated spacing corresponds to a spacing of the first excitation spot pattern and not to a spacing of the second excitation spot pattern; and determining that the particle is a particle type that is excited by light of the first spot pattern and not the second spot pattern.

32. The system of claim 29, wherein:
- the instructions further cause the system to determine a total number of fluorescence signal spikes detected as the particle moves past the excitation spot patterns; and
- the instructions that cause the system to determine the identity of the particle comprise instructions for determining the identity of the particle based on the determined number of fluorescence signal spikes.

33. The system of claim 32, wherein the instructions that cause the system to determine the identity of the particle based on the determined number of fluorescence signal spikes comprise instructions for:
- determining that the determined number of fluorescence signal spikes corresponds to a number of spots in the first excitation spot pattern and not to a number of spots in the second excitation spot pattern; and
- determining that the particle is a particle type that is excited by light of the first spot pattern and not the second spot pattern.

* * * * *